US012706018B2

(12) United States Patent
Kim et al.

(10) Patent No.: US 12,706,018 B2
(45) Date of Patent: Aug. 11, 2026

(54) DISPLAY DEVICE, DRIVING METHOD THEREOF, AND ELECTRONIC DEVICE INCLUDING THE SAME

(71) Applicant: Samsung Display Co., Ltd., Yongin-Si (KR)

(72) Inventors: Sungwon Kim, Yongin-si (KR); Kangnam Kim, Yongin-si (KR); Hyun Soo Lee, Yongin-si (KR); Ji Hun Kim, Yongin-si (KR); Wooseok Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/280,554

(22) Filed: Jul. 25, 2025

(65) Prior Publication Data

US 2026/0221073 A1 Jul. 30, 2026

(30) Foreign Application Priority Data

Jan. 24, 2025 (KR) ........................ 10-2025-0011272

(51) Int. Cl.

*G09G 3/20* (2006.01)
*G09G 3/00* (2006.01)
*G09G 3/3233* (2016.01)

(52) U.S. Cl.

CPC ........... *G09G 3/2092* (2013.01); *G09G 3/006* (2013.01); *G09G 3/3233* (2013.01); *G09G 2300/0842* (2013.01); *G09G 2310/08* (2013.01); *G09G 2320/0233* (2013.01); *G09G 2330/10* (2013.01)

(58) Field of Classification Search

CPC .... G09G 3/2092; G09G 3/006; G09G 3/3233; G09G 2300/0842; G09G 2310/08; G09G 2320/0233; G09G 2330/10

See application file for complete search history.

(56) References Cited

U.S. PATENT DOCUMENTS

| | | | | |
|---|---|---|---|---|
| 9,111,491 | B2 | 8/2015 | Woo et al. | |
| 10,770,007 | B2 | 9/2020 | Kim et al. | |
| 12,106,693 | B2 | 10/2024 | Ban et al. | |
| 2019/0206356 | A1* | 7/2019 | Kim | G09G 3/3607 |
| 2020/0058252 | A1 | 2/2020 | Kim et al. | |
| 2022/0084450 | A1* | 3/2022 | Kim | G09G 3/20 |

(Continued)

FOREIGN PATENT DOCUMENTS

| | | | |
|---|---|---|---|
| KR | 1020180050083 | A | 5/2018 |
| KR | 102027169 | B1 | 10/2019 |

(Continued)

*Primary Examiner* — Peter D Mcloone
(74) *Attorney, Agent, or Firm* — Innovation Counsel LLP

(57) ABSTRACT

Provided is a display device which may include an i-th pixel which receives a data voltage and a reference voltage in response to an i-th scan signal during a display period, and an (i+1)-th pixel which receives the data voltage and the reference voltage in response to an (i+1)-th scan signal during the display period. The i-th scan signal may be applied to the i-th pixel during first to third periods of a blank period, the (i+1)-th scan signal may be applied to the (i+1)-th pixel during the first period, the i-th pixel may receive a data voltage for sensing and the reference voltage during the first period, and a level of the reference voltage may be changed by the (i+1)-th pixel.

20 Claims, 25 Drawing Sheets

(56) References Cited

U.S. PATENT DOCUMENTS

| | | | | |
|---|---|---|---|---|
| 2022/0335881 | A1* | 10/2022 | Kim | G09G 3/32 |
| 2024/0005879 | A1 | 1/2024 | Kim et al. | |
| 2024/0257714 | A1* | 8/2024 | Yun | G09G 3/32 |

FOREIGN PATENT DOCUMENTS

| | | | |
|---|---|---|---|
| KR | 1020200019529 | A | 2/2020 |
| KR | 1020230134052 | A | 9/2023 |
| KR | 1020240003014 | A | 1/2024 |

* cited by examiner

[DSP]

[TP1]

[TP2]

[TP3]

[DSP]

[DSP]

[TP1]

[TP2]

[SNP1]

[SNP2,P2]

DISPLAY DEVICE, DRIVING METHOD THEREOF, AND ELECTRONIC DEVICE INCLUDING THE SAME

CROSS-REFERENCE TO RELATED APPLICATIONS

This U.S. non-provisional patent application claims priority under 35 U.S.C. § 119 of Korean Patent Application No. 10-2025-0011272, filed on Jan. 24, 2025, the entire contents of which are hereby incorporated by reference.

BACKGROUND

The present disclosure herein relates to a display device, a driving method thereof, and an electronic device including the same.

An electronic device, such as a smartphone, a digital camera, a laptop, a navigation device, and a smart television. The electronic device, which provides an image to a user, includes a display device for displaying an image. The display device generates an image and provides the generated image to a user through a display screen.

The display device includes a display panel which includes a plurality of pixels for generating an image, a scan driver which applies scan signals to the pixels, and a data driver which applies data voltages to the pixels. The pixels receive the data voltages in response to the scan signals and generate an image by using the data voltages.

When some pixels have a defect, this defect may affect a neighboring pixel such that the neighboring pixel may emit light with luminance higher than normal luminance and may be viewed as a bright spot. Thus, it would be desirable to develop technology for detecting the amount of change in luminance of a bright spot pixel which may be viewed as a bright spot and compensating luminance of the bright spot pixel.

SUMMARY

The present disclosure provides a display device capable of detecting luminance change in a bright spot pixel around a defective pixel and compensating luminance of the bright spot pixel, a driving method thereof, and an electronic device including the same.

An embodiment of the inventive concept provides a display device including an i-th pixel which is disposed in an i-th row, and during a display period, receives a data voltage and a reference voltage in response to an i-th scan signal, and an (i+1)-th pixel which is disposed in an (i+1)-th row, and during the display period, receives the data voltage and the reference voltage in response to an (i+1)-th scan signal, wherein a blank period following the display period includes a first period, a second period, and a third period, wherein the first period, the second period and the third period are continuous, the i-th scan signal is applied to the i-th pixel during the first to third periods, the (i+1)-th scan signal is applied to the (i+1)-th pixel during the first period, and during the first period, the i-th pixel receives a data voltage for sensing and the reference voltage, and a level of the reference voltage is changed by the (i+1)-th pixel where i is a natural number.

During the display period, the i-th scan signal and the (i+1)-th scan signal may be sequentially applied to the i-th pixel and the (i+1)-th pixel, respectively, and the (i+1)-th scan signal may at least partially overlap the i-th scan signal.

A level of the reference voltage may be lowered by the (i+1)-th pixel during the first period.

The i-th scan signal may comprise an i-th write scan signal and an i-th sampling scan signal, the (i+1)-th scan signal may comprise an (i+1)-th write scan signal and an (i+1)-th sampling scan signal, and the i-th write scan signal may be activated during the first and third periods and applied to the i-th pixel, the i-th sampling scan signal may be activated during the first to third periods and applied to the i-th pixel, and the (i+1)-th sampling scan signal is activated during the first period and applied to the (i+1)-th pixel. During the first period, the i-th pixel may receive the data voltage for sensing in response to the i-th write scan signal and may receive the reference voltage in response to the i-th sampling scan signal. During the first period, the (i+1)-th pixel may be connected to a reference line which receives the reference voltage, in response to the (i+1)-th sampling scan signal. The (i+1)-th pixel may comprise a light-emitting element including an anode and a cathode wherein the anode and the cathode are short-circuited, and a short-circuit resistance which is formed at a portion of the display device where the short circuit has occurred and is connected to the reference line during the first period. During the second period, the i-th write scan signal may be deactivated, and during the second period, a sensing voltage may be sensed in the i-th pixel according to the data voltage for sensing, the reference voltage, and the short-circuit resistance may be output through the reference line.

In an embodiment the (i+1)-th write scan signal may be deactivated during the first to third periods, and the (i+1)-th sampling scan signal is deactivated during the second and third periods. In an embodiment during the display period, the i-th write scan signal and the i-th sampling scan signal may be applied to the i-th pixel at the same timing, the i-th pixel may receive the data voltage in response to the i-th write scan signal and may receive the reference voltage in response to the i-th sampling scan signal, during the display period, the (i+1)-th write scan signal and the (i+1)-th sampling scan signal may be applied to the (i+1)-th pixel at the same timing and the (i+1)-th pixel may receive the data voltage in response to the (i+1)-th write scan signal and may receive the reference voltage in response to the (i+1)-th sampling scan signal.

In an embodiment the display device may further comprise a data line which may be connected to the i-th and (i+1)-th pixels, may receive the data voltage during the display period, may receive the data voltage for sensing during the first period, and may receive a restoration data voltage during the third period, a reference line which may be connected to the i-th and (i+1)-th pixels and may receive the reference voltage during the display period, the first period, and the third period, an i-th write scan line which may connected to the i-th pixel and may receive the i-th write scan signal, an i-th sampling scan line which may be connected to the i-th pixel and may receive the i-th sampling scan signal, an (i+1)-th write scan line which may be connected to the (i+1)-th pixel and may receive the (i+1)-th write scan signal, and an (i+1)-th sampling scan line which may be connected to the (i+1)-th pixel and may receive the (i+1)-th sampling scan signal. The i-th pixel may comprise a first transistor that may include a first electrode connected to a first power line, a control electrode connected to a first node, and a second electrode connected to a second node, a second transistor that may include a first electrode connected to the data line, a second electrode connected to the first node, and a control electrode connected to the i-th write scan line, a third transistor that may include a first electrode connected to the reference line, a second electrode connected to the second node, and a control electrode connected to the i-th sampling scan line, an i-th capacitor that may include a first electrode connected to the first node and a second electrode connected to the second node, and an i-th light-emitting element that may including an anode connected to the second node and a cathode connected to a second power line. The (i+1)-th pixel may comprise, a (1-1)-th transistor that may include a first electrode connected to the first power line, a control electrode connected to a (1-1)-th node, and a second electrode connected to a (2-1)-th node, a (2-1)-th transistor that may include a first electrode connected to the data line, a second electrode connected to the (1-1)-th node, and a control electrode connected to the (i+1)-th write scan line, a (3-1)-th transistor that may include a first electrode connected to the reference line, a second electrode connected to the (2-1)-th node, and a control electrode connected to the (i+1)-th sampling scan line, an (i+1)-th capacitor that may include a first electrode connected to the (1-1)-th node and a second electrode connected to the (2-1)-th node, an (i+1)-th light-emitting element that may include an anode connected to the (2-1)-th node and a cathode connected to the second power line and short-circuit resistance which may be formed since a portion of the anode and a portion of the cathode are short-circuited. In an implementation, the display device may further comprise a timing controller that may be configured to compensate the data voltage applied to the i-th pixel on the basis of a sensing voltage output through the reference line connected to the i-th pixel during the second period.

In an embodiment a display-on period may comprise the display period and the blank period, and a display-off period before the display-on period are defined, the display-off period may comprise a first sensing period and a second sensing period, during the first sensing period, the i-th scan signal and the (i+1)-th scan signal may be sequentially applied to the i-th pixel and the (i+1)-th pixel, respectively, the i-th pixel may receive a voltage for sensing and the reference voltage in response to the i-th scan signal, and the (i+1)-th pixel may receive the voltage for sensing and the reference voltage in response to the (i+1)-th scan signal. The second sensing period may comprise a fourth period, a fifth period, a sixth period, a seventh period, an eighth period, and a nineth period, wherein the fourth period, the fifth period, the sixth period, the seventh period, the eighth period, and the nineth period are continuous, the i-th write scan signal may be activated during the fourth and sixth periods of the second sensing period and applied to the i-th pixel, and the i-th sampling scan signal may be activated during the fourth to sixth periods of the second sensing period and applied to the i-th pixel, the (i+1)-th write scan signal may be activated during the seventh and nineth periods of the second sensing period and applied to the (i+1)-th pixel, and the (i+1)-th sampling scan signal may be activated during the fourth period of the second sensing period and the seventh to nineth periods of the second sensing period and applied to the (i+1)-th pixel, and the i-th pixel may receive the data voltage for sensing and the reference voltage during the fourth period of the second sensing period, the (i+1)-th pixel may receive the data voltage for sensing and the reference voltage during the seventh period of the second sensing period, and a level of the reference voltage may be lowered by the (i+1)-th pixel during the fourth period of the second sensing period.

In an embodiment of the inventive concept, a driving method of a display device includes applying a data voltage and a reference voltage to an i-th pixel disposed in an i-th row in synchronization with an i-th scan signal during a display period, applying the data voltage and the reference voltage to an (i+1)-th pixel disposed in an (i+1)-th row in synchronization with an (i+1)-th scan signal during the display period, applying a data voltage for sensing to the i-th pixel in synchronization with an i-th write scan signal of the i-th scan signal during a first period of a blank period following the display period, applying the reference voltage to the i-th pixel in synchronization with an i-th sampling scan signal of the i-th scan signal during the first period, connecting the (i+1)-th pixel to a reference line, which receives the reference voltage, in synchronization with an (i+1)-th sampling scan signal of the (i+1)-th scan signal during the first period, and during a second period following the first period, outputting, through the reference line, a sensing voltage sensed in the i-th pixel according to the data voltage for sensing, the reference voltage, and the short-circuit resistance which is formed since an anode and a cathode of the (i+1)-th pixel are short-circuited where i is a natural number.

In an embodiment the driving method may further include compensating the data voltage applied to the i-th pixel on the basis of the sensing voltage output through the reference line. In an embodiment the driving method may further include lowering a level of the reference voltage by the (i+1)-th pixel during the first period, wherein the (i+1)-th pixel may include a light-emitting element including an anode and a cathode wherein the anode and the cathode are short-circuited, and a short-circuit resistance which may be formed at a portion where the short circuit has occurred and is connected to the reference line during the first period. In an embodiment, the driving method may further include applying a restoration data voltage to the i-th pixel in synchronization with the i-th write scan signal during a third period following the second period and applying the reference voltage to the i-th pixel in synchronization with the i-th sampling scan signal during the third period.

In an embodiment of the inventive concept, an electronic device includes a display device providing an image to a user and a processor configured to process and provide an image signal to the display device, wherein the display device includes an i-th pixel which is disposed in an i-th row, and during a display period, receives a data voltage and a reference voltage in response to an i-th scan signal, and an (i+1)-th pixel which is disposed in an (i+1)-th row, and during the display period, receives the data voltage and the reference voltage in response to an (i+1)-th scan signal, a blank period following the display period includes a first period, a second period, and a third period and the first period, the second period and the third period are which are continuous, the i-th scan signal is applied to the i-th pixel during the first to third periods, the (i+1)-th scan signal is applied to the (i+1)-th pixel during the first period, during the first period, the i-th pixel receives a data voltage for sensing and the reference voltage, and during the first period, a level of the reference voltage is lowered by the (i+1)-th pixel and during a second period following the first period a sensing voltage sensed in the i-th pixel is output through a reference line and wherein i is a natural number.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
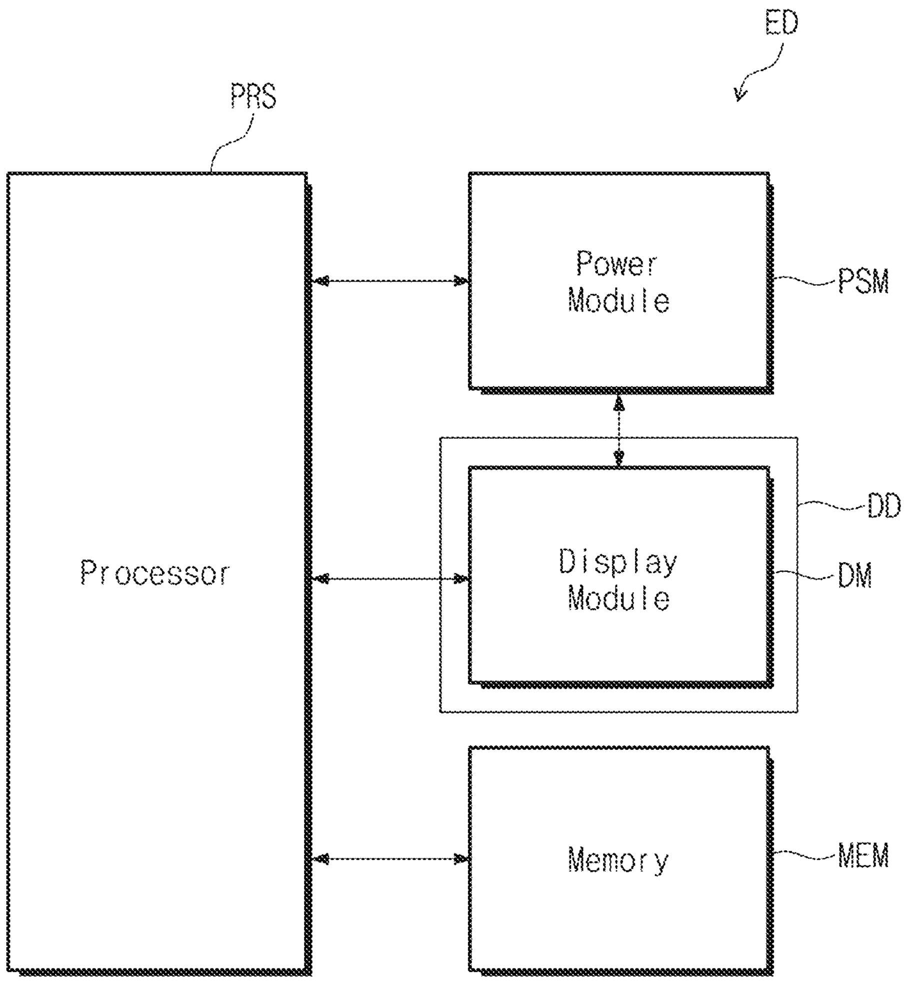
FIG. 1 is a block diagram of an electronic device according to an embodiment of the inventive concept.

In this specification, it will be understood that when an element (or a region, a layer, a portion, or the like) is referred to as being "on", "connected to" or "coupled to" another element, it may be directly disposed on, connected to, or coupled to the other element, or other elements may be disposed therebetween.

Like reference numerals or symbols refer to like elements throughout. In the drawings, the thickness, ratio, and size of the elements are exaggerated for effectively describing the technical contents. As used herein, the term "and/or" includes any and all combinations of one or more of the associated listed elements.

It will be understood that, although the terms "first", "second", etc. may be used herein to describe various elements, the elements are not to be limited by these terms. These terms are only used to distinguish one element, component, region, layer or section from another element, component, region, layer or section. For instance, a first element, component, region, layer or section discussed below could be termed a second element, component, region, layer or section without departing from the scope of the inventive concept. Similarly, a second element, component, region, layer or section could be termed a first element, component, region, layer or section. In this specification, the singular expressions "a", "an" and "the" are intended to include the plural forms as well, unless the context clearly indicates otherwise.

In addition, the terms "below", "under", "on the lower side", "above", "over", "on the upper side", or the like may be used to describe the relationships between the elements illustrated in the drawings. These terms are relative concepts and are described on the basis of the directions indicated in the drawings.

It will be further understood that the terms "comprises, includes, has" and/or "comprising, including, having", when used in this specification, specify the presence of stated features, numbers, steps, operations, elements, components or combinations thereof, but do not preclude the possibility of the presence or addition of one or more other features, numbers, steps, operations, elements, components, and/or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept are described with reference to the drawings.

FIG. 1 is a block diagram of an electronic device according to an embodiment of the inventive concept.

Referring to FIG. 1, an electronic device ED according to an embodiment may include a display device DD which provides an image to a user, and may further include another module or device having an additional function in addition to the display device DD. The electronic device ED according to an embodiment may include a display module DM, one or more processors PRS, a memory MEM, and a power module PSM, and the display device DD may include the display module DM.

The one or more processors PRS may include at least one among a central processing unit (CPU), an application processor (AP), a graphic processing unit (GPU), a communication processor (CP), an image signal processor (ISP), and a controller. The one or more may carry out operations either as individual units, as a collective, or as mixture with some processors carrying out the operation and processors carrying out other operations. For example, if there are two processors each processor may carry out a different step in an operation or one processor may perform all the operation steps. The one or more processors PRS may process and provide an image signal to the display device DD, and the display device DD may generate an image corresponding to the image signal.

In an embodiment, the one or more processors PRS may be divided into two or more from a functional or structural point of view and provided. For example, the one or more processors PRS may include a main processor in a form of a first driving chip including a central processing unit, and an auxiliary processor in a form of a second driving chip including a controller that receives an image signal from the main processor and processes the image signal to comply with specifications of interface of the display module DM.

Data information for operation of the one or more processors PRS or the display module DM may be stored in the memory MEM. When the one or more processors PRS execute an application stored in the memory MEM, an image data signal and/or an input control signal may be transmitted to the display module DM, and the display module DM may process the provided signal and output image information through a display screen.

The power module PSM may include a power supply module such as a power adaptor or a battery device and a power conversion module which converts power supplied by the power supply module and generates power for operation of the electronic device ED. The power module PSM may supply power to the display module DM and the processor PRS.

At least one of the components of the electronic device ED described above may be included in the display device DD according to embodiments described above. In addition, some individual modules included in functionally one module may be included in the display device DD, and the others may be provided separately from the display device DD. For example, the display device DD may include the display module DM, and the one or more processors PRS, the memory MEM, and the power module PSM may be provided in a form of a device, in the electronic device ED, different from the display device DD.

Figure 2:
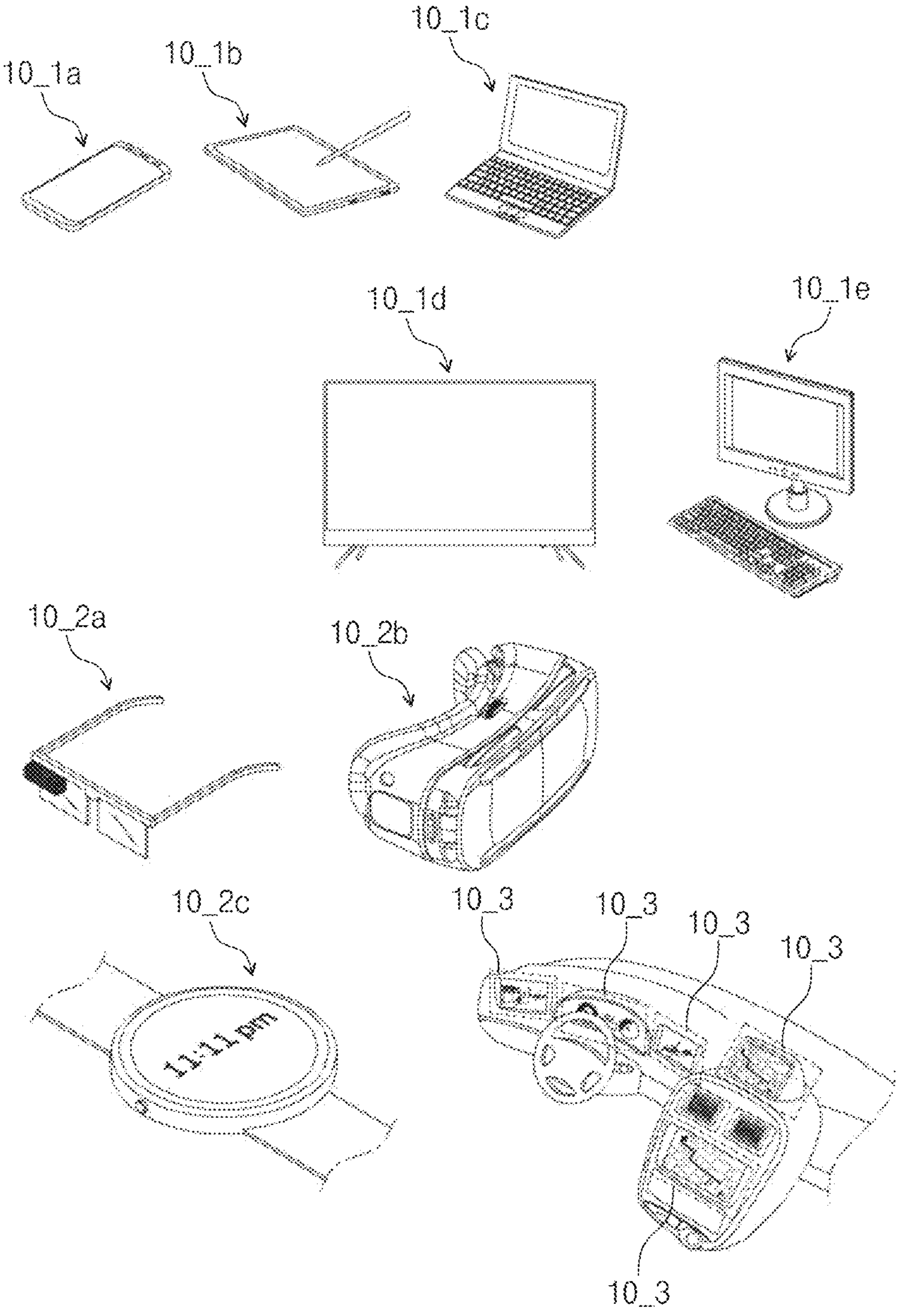
FIG. 2 is schematic diagrams of an electronic device according to various embodiments.

FIG. 2 is schematic diagrams of an electronic device according to various embodiments.

Referring to FIG. 2, the display device DD according to an embodiment of the inventive concept may be applied to various electronic devices. For example, the various electronic devices may include electronic devices for displaying images, such as a smartphone 10_1*a*, a tablet PC 10_1*b*, a laptop 10_1*c*, a television 10_1*d*, or a desk monitor 10_1*e*.

In addition according to an embodiment, the display device DD may be applied to various electronic devices including wearable electronic devices such as smart glasses 10_2*a*, a head-mounted display 10_2*b*, or a smart watch 10_2*c*. In addition, the various electronic devices may include automotive electronic devices 10_3 such as a center information display (CID) disposed on an instrument panel, a center fascia, and a dashboard of an automobile, or a room mirror display.

Figure 3:
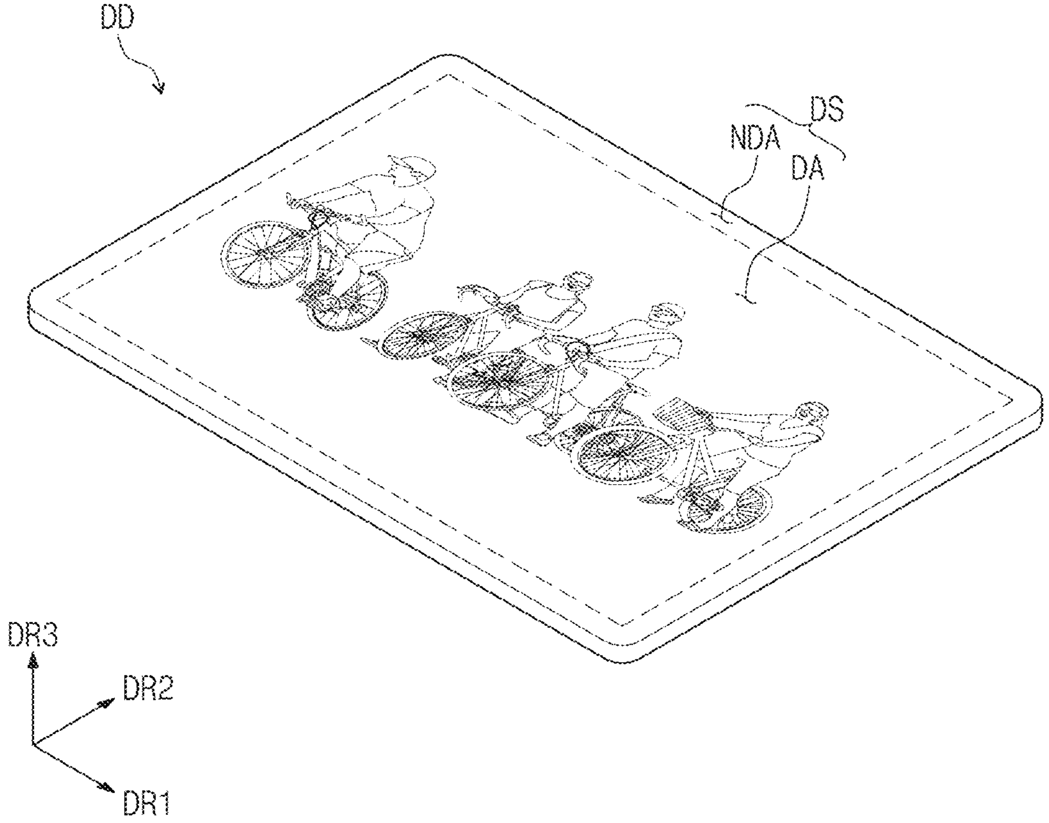
FIG. 3 is a perspective view of a display device according to an embodiment of the inventive concept.

FIG. 3 is a perspective view of a display device according to an embodiment of the inventive concept.

Referring to FIG. 3, the display device DD may have long sides extending in a first direction DR1 and short sides extending in a second direction DR2 crossing the first direction DR1. The corners of the display device DD may have a round shape.

Hereinafter, a direction substantially perpendicularly crossing a plane defined by the first direction DR1 and the second direction DR2 is defined as a third direction DR3. In addition, as used herein, the wording "in a plan view" may be defined as a state of being viewed in the third direction DR3.

An upper surface of the display device DD may be defined as a display surface DS and have a plane defined by the first direction DR1 and the second direction DR2. An image generated in the display device DD may be provided to a user through the display surface DS.

The display surface DS may include a display region DA and a non-display region NDA around the display region DA. An image may be displayed in the display region DA, and an image may not be displayed in the non-display region NDA. The non-display region NDA may surround the display region DA and define an edge, of the display device DD.

Figure 4:
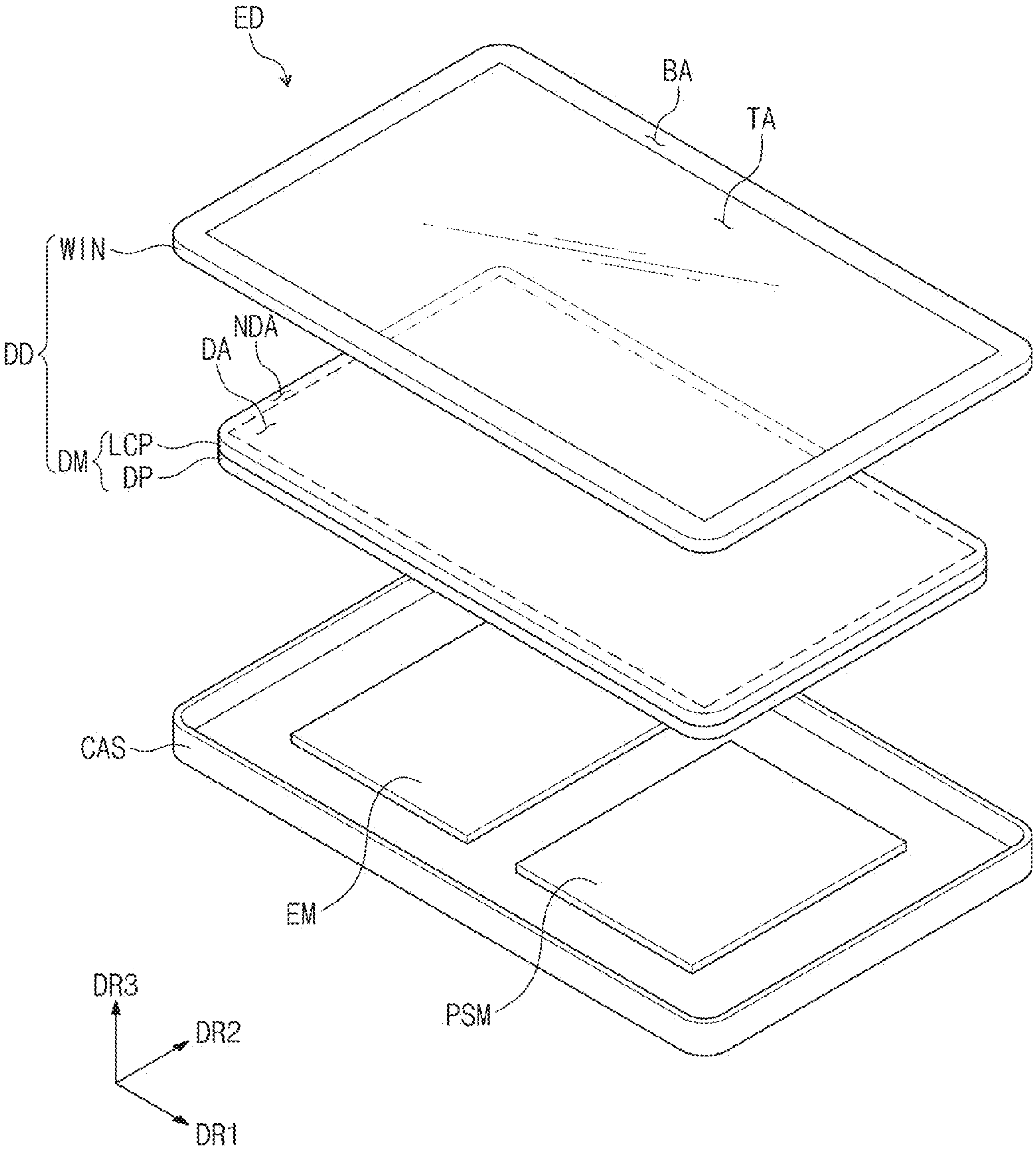
FIG. 4 is an exploded perspective view of an electronic device according to an embodiment of the inventive concept.

FIG. 4 is an exploded perspective view of an electronic device according to an embodiment of the inventive concept.

Referring to FIG. 4, the electronic device ED may include the display device DD, an electronic module EM, the power module PSM, and a case CAS. The display device DD may include the display module DM, and a window WIN disposed on the display module DM.

The electronic module EM and the power module PSM may be disposed under the display device DD. Although not illustrated, the electronic module EM and the power module PSM may be connected to each other through a separate flexible circuit board.

The electronic module EM may control an operation of the display device DD. The electronic module EM may include the one or more processors PRS described above. The power module PSM may supply power to the electronic module EM and the display module DM.

The case CAS may be disposed under the electronic module EM and the power module PSM. The case CAS may accommodate the display device DD, the electronic module EM, and the power module PSM. The case CAS may protect the display device DD, the electronic module EM, and the power module PSM.

The display module DM may have long sides extending in the first direction DR1 and short sides extending in the second direction DR2. Corners of the display module DM may have a round shape.

The display module DM may include a display region DA and a non-display region NDA around the display region DA. The non-display region NDA may surround the display region DA. The display region DA and the non-display region NDA of the display module DM may respectively correspond to the display region DA and the non-display region NDA illustrated in FIG. 3. An image may be generated in the display region DA, and an image may not be generated in the non-display region NDA.

The display module DM may include a display panel DP, and a light conversion part LCP disposed on the display panel DP. The display panel DP may include a display region DA, and a non-display region NDA disposed around the display region DA and surrounding the display region DA like the display module DM. An image may be generated in the display region DA of the display panel DP.

The display panel DP according to an embodiment of the inventive concept may be an emissive display panel. For example, the display panel DP may be an organic light-emitting display panel or an inorganic light-emitting display panel. An emission layer of the organic light-emitting display panel may include an organic light-emitting material. An emission layer of the inorganic light-emitting display panel may include quantum dots, quantum rods, and the like. Hereinafter, the display panel DP may be described as an organic light-emitting display panel.

The light conversion part LCP may be provided with light generated in the display panel DP and convert a color of the provided light. In addition, the light conversion part LCP may reduce reflectance for external light. Such a component will be described below in detail.

The window WIN may have an optically transparent property. For example, the window WIN may include glass, transparent plastic, or the like. The window WIN may protect the display module DM from external impacts and scratches. A front surface of the window WIN may correspond to the display surface DS of the display device DD described above.

The front surface of the window WIN may include a transmission region TA and a bezel region BA around the transmission region TA. The transmission region TA may transmit light. The bezel region BA may surround the transmission region TA, may be printed in a predetermined color, and block light. In a plan view, the transmission region TA may overlap the display region DA, and the bezel region BA may overlap the non-display region NDA.

An image generated in the display region DA may be provided to an external user through the transmission region TA. The non-display region NDA may not be exposed to the outside due to the bezel region BA.

Although not illustrated, the display device DD may further include an input sensing part disposed between the display panel DP and the light conversion part LCP. The input sensing part may include a plurality of sensing portions (not illustrated) for sensing an external input. The sensing portions may sense an external input in a capacitive manner.

The input sensing part may be directly manufactured on the display panel DP when the display panel DP is manufactured. However, an embodiment of the inventive concept is not limited thereto, and the input sensing part may be manufactured as a separate panel from the display panel DP and attached to the display panel DP through an adhesive.

Figure 5:
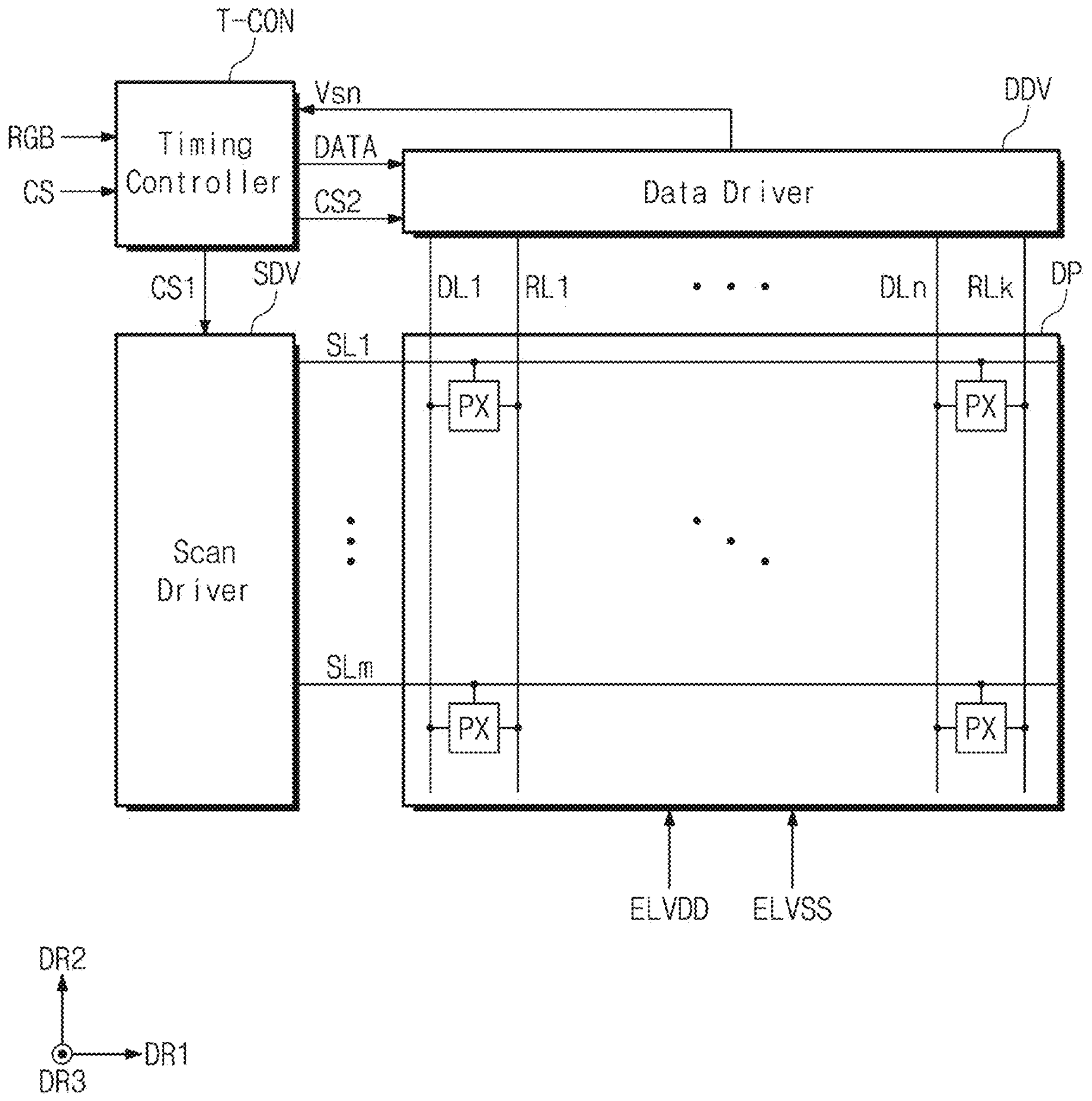
FIG. 5 is a block diagram of the display device illustrated in FIG. 3.

FIG. 5 is a block diagram of the display device illustrated in FIG. 3.

Referring to FIG. 5, the display device DD may include the display panel DP, a scan driver SDV, a data driver DDV, and a timing controller T-CON. The display panel DP may include a plurality of pixels PX, a plurality of scan lines SL1 to SLm, a plurality of data lines DL1 to DLn, and a plurality of reference lines RL1 to RLk. k, m, and n are natural numbers.

The scan lines SL1 to SLm may extend in the first direction DR1 and may be connected to the pixels PX and the scan driver SDV. The data lines DL1 to DLn and the reference lines RL1 to RLk may extend in the second direction DR2 and may be connected to the pixels PX and the data driver DDV.

A first voltage ELVDD and a second voltage ELVSS may be provided to the display panel DP. The first voltage ELVDD may have a higher level than the second voltage ELVSS. The first voltage ELVDD and the second voltage ELVSS may be applied to the pixels PX.

The timing controller T-CON may receive image signals RGB and a control signal CS from the one or more processors PRS described above. The timing controller T-CON may convert a data format of the image signals RGB to comply with specifications of interface with the data driver DDV and generate image data DATA. The timing controller T-CON may provide the image data DATA, in which the data format is converted, to the data driver DDV.

The timing controller T-CON may generate and output a scan control signal CS1 and a data control signal CS2 in response to the control signal CS provided from the outside. The scan control signal CS1 may be provided to the scan driver SDV, and the data control signal CS2 may be provided to the data driver DDV.

The scan driver SDV may generate a plurality of scan signals in response to the scan control signal CS1. The scan signals may be applied to the pixels PX through the scan lines SL1 to SLm.

The data driver DDV may generate a plurality of data voltages corresponding to the image data DATA in response to the data control signal CS2. The data voltages may be applied to the pixels PX through the data lines DL1 to DLn.

The pixels PX may be provided with the data voltages in response to the scan signals. The pixels PX may display an image by emitting light of luminance corresponding to the data voltages.

The data driver DDV may apply data voltages for sensing and reference voltages to the pixels PX. The data voltages for sensing may be applied to the pixels PX through the data lines DL1 to DLn. The reference voltages may be applied to the pixels PX through the reference lines RL1 to RLk.

Sensing voltages Vsn sensed in the pixels PX according to the data voltages for sensing and the reference voltages may be provided to the data driver DDV through the reference lines RL1 to RLk. The timing controller T-CON may compensate a data voltage applied to a bright spot pixel adjacent to a defective pixel on the basis of the sensing voltages Vsn. Such an operation will be described below in detail.

Figure 6:
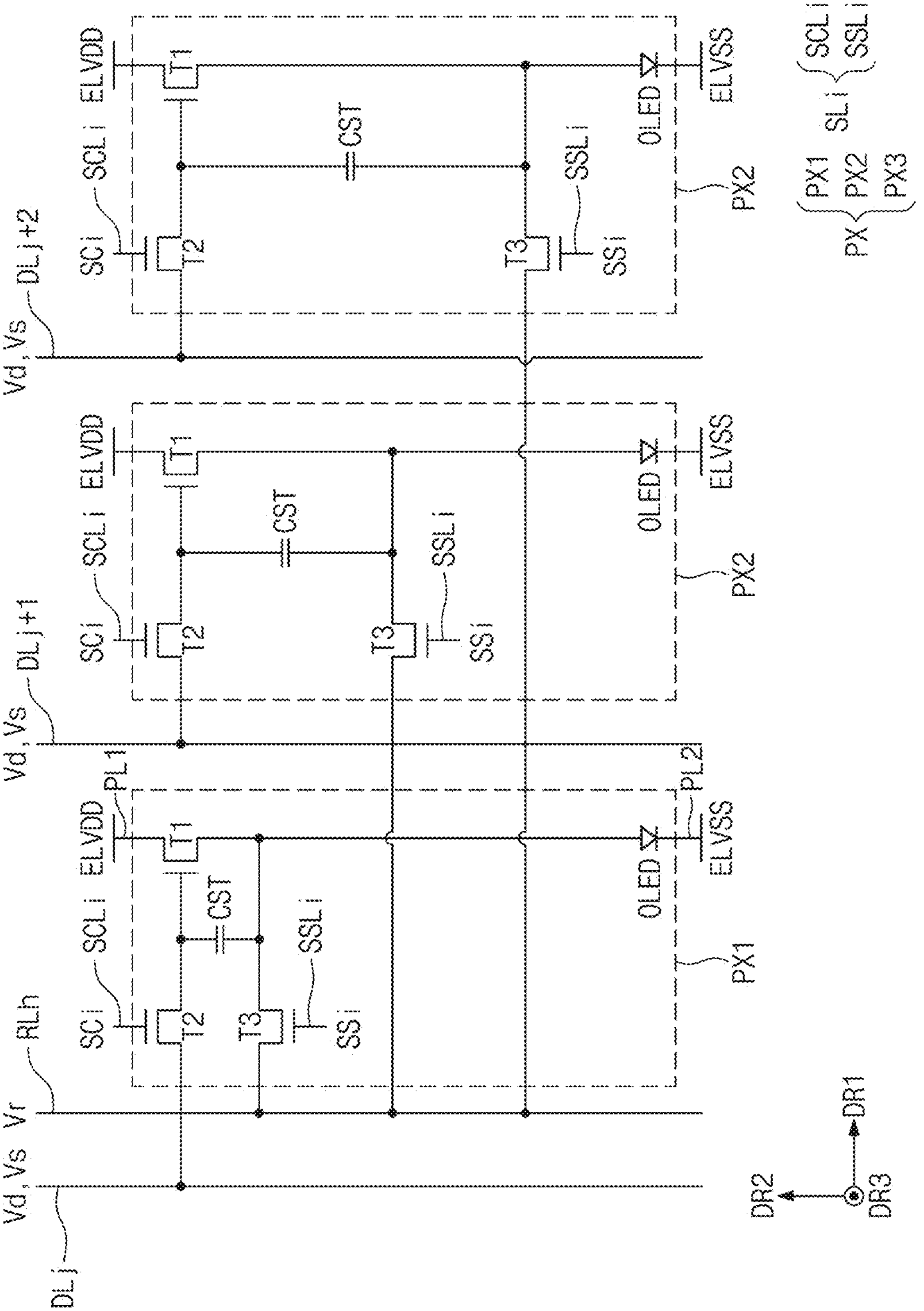
FIG. 6 is a diagram illustrating an equivalent circuit of a first pixel, a second pixel, and a third pixel among pixels illustrated in FIG. 5.

FIG. 6 is a diagram illustrating an equivalent circuit of a first pixel, a second pixel, and a third pixel among the pixels illustrated in FIG. 5.

Referring to FIG. 6, the pixels PX may include a first pixel PX1, a second pixel PX2, and a third pixel PX3. The first pixel PX1, the second pixel PX2, and the third pixel PX3 may be arranged in the first direction DR1. The first pixel PX1, the second pixel PX2, and the third pixel PX3 may emit light of different colors from each other. For example, the first pixel PX1 may emit light of red, the second pixel PX2 may emit light of blue, and the third pixel PX3 may emit light of green.

The first direction DR1 may correspond to a row, and the second direction DR2 may correspond to a column. By way of example, FIG. 6 illustrates the first pixel PX1, the second pixel PX2, and the third pixel PX3 disposed in an i-th row, a j-th column, a (j+1)-th column, and a (j+2)-th column. i and j are natural numbers. Although not illustrated, each of the first pixel PX1, the second pixel PX2, and the third pixel PX3 may be provided in plurality to the display panel DP.

The first pixel PX1 may be connected to a j-th data line DLj, an i-th scan line SLi, an h-th reference line RLh, a first power line PL1, and a second power line PL2. The second pixel PX2 may be connected to a (j+1)-th data line DLj+1, the i-th scan line SLi, the h-th reference line RLh, the first power line PL1, and the second power line PL2. The third pixel PX3 may be connected to a (j+2)-th data line DLj+2, the i-th scan line SLi, the h-th reference line RLh, the first power line PL1, and the second power line PL2.

The first pixel PX1, the second pixel PX2, and the third pixel PX3 may be respectively connected to the j-th data line DLj, the (j+1)-th data line DLj+1, and the (j+2)-th data line DLj+2. The first pixel PX1, the second pixel PX2, and the third pixel PX3 may be connected to the h-th reference line RLh in common.

The j-th data line DLj, the (j+1)-th data line DLj+1, and the (j+2)-th data line DLj+2 may each receive a data voltage Vd and a data voltage Vs for sensing. The h-th reference line RLh may receive a reference voltage Vr.

The i-th scan line SLi may receive i-th scan signals SCi and SSi. The i-th scan line SLi may include an i-th write scan line SCLi and an i-th sampling scan line SSLi. The i-th scan signals SCi and SSi may include an i-th write scan signal SCi and an i-th sampling scan signal SSi. The i-th write scan line SCLi may receive the i-th write scan signal SCi. The i-th sampling scan line SSLi may receive the i-th sampling scan signal SSi.

The first power line PL1 may receive the first voltage ELVDD. The second power line PL2 may receive the second voltage ELVSS.

The first pixel PX1, the second pixel PX2, and the third pixel PX3 may each include a plurality of transistors T1, T2, and T3, a capacitor CST, and a light-emitting element OLED. Since configurations of the first pixel PX1, the second pixel PX2, and the third pixel PX3 are the same, hereinafter, a circuit configuration of the first pixel PX1 will be described with reference to FIG. 7 as an example.

Figure 7:
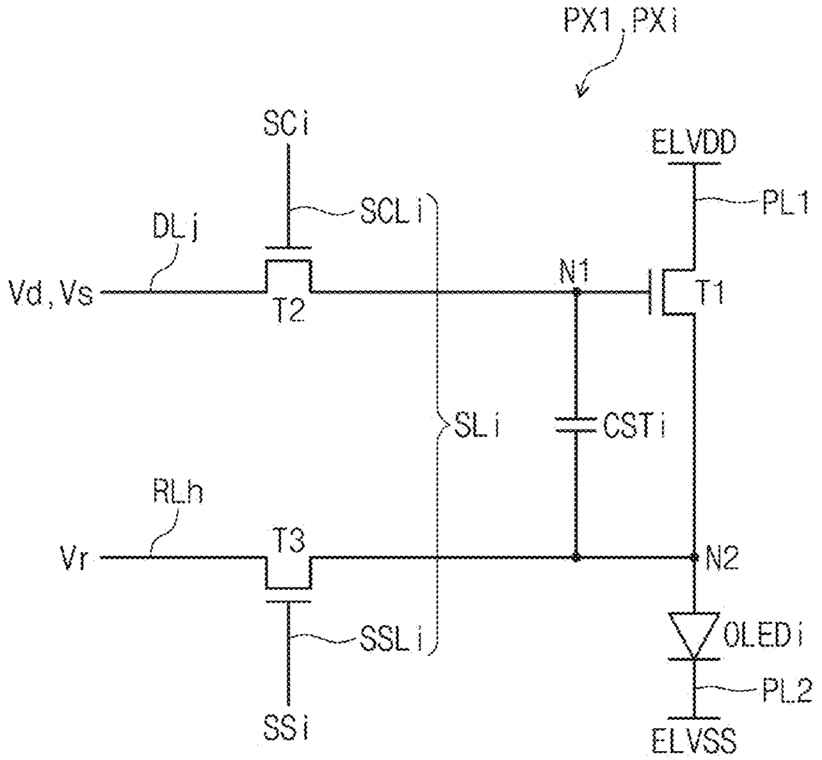
FIG. 7 is an equivalent circuit diagram of the first pixel illustrated in FIG. 6.

FIG. 7 is an equivalent circuit diagram of the first pixel illustrated in FIG. 6.

Hereinafter, in FIG. 7, the first pixel PX1 is defined as an i-th pixel PXi disposed in the i-th row, the light-emitting element OLED is defined as an i-th light-emitting element OLEDi, and the capacitor CST is defined as an i-th capacitor CSTi.

Referring to FIG. 7, the i-th pixel PXi may be connected to the j-th data line DLj, the h-th reference line RLh, the i-th write scan line SCLi, and the i-th sampling scan line SSLi.

The i-th pixel PXi may include the i-th light-emitting element OLEDi, the plurality of transistors T1, T2, and T3, and the i-th capacitor CSTi. The transistors T1, T2, and T3 may include a first transistor T1, a second transistor T2, and a third transistor T3.

The first, second, and third transistors T1, T2, and T3 may be NMOS transistors, but are not limited thereto and may be PMOS transistors. The first, second, and third transistors T1, T2, and T3 may each include a source electrode, a drain electrode, and a gate electrode. Hereinafter, in this specification, for convenience, any one of the source electrodes and the drain electrode is defined as a first electrode, and the other is defined as a second electrode. In addition, the gate electrode is defined as a control electrode.

The i-th light-emitting element OLEDi may be an organic light-emitting element including an anode and a cathode. The anode of the i-th light-emitting element OLEDi may receive the first voltage ELVDD through the first transistor T1, and the cathode of the i-th light-emitting element OLEDi may receive the second voltage ELVSS. The i-th light-emitting element OLEDi may emit light by receiving the first voltage ELVDD and the second voltage ELVSS.

The first transistor T1 may include a first electrode which is connected to the first power line PL1 and receives the first voltage ELVDD, a control electrode which is connected to a first node N1, and a second electrode which is connected to a second node N2. The first transistor T1 may be switched by a voltage of the first node N1.

The anode of the i-th light-emitting element OLEDi may be connected to the second node N2. The cathode of the i-th light-emitting element OLEDi may be connected to the second power line PL2 and receive the second voltage ELVSS.

The second transistor T2 may include a first electrode which is connected to the j-th data line DLj, a second electrode which is connected to the first node N1, and a control electrode which is connected to the i-th write scan line SCLi. The second transistor T2 may be switched by the i-th write scan signal SCi which is received through the i-th write scan line SCLi. The second transistor T2 may receive the data voltage Vd and the data voltage Vs for sensing through the j-th data line DLj.

The third transistor T3 may include a first electrode which is connected to the h-th reference line RLh, a second electrode which is connected to the second node N2, and a control electrode which is connected to the i-th sampling scan line SSLi. The third transistor T3 may be switched by the i-th sampling scan signal SSi which is received through the i-th sampling scan line SSLi. The third transistor T3 may receive the reference voltage Vr through the h-th reference line RLh.

The i-th capacitor CSTi may include a first electrode connected to the first node N1 and a second electrode connected to the second node N2. The i-th capacitor CSTi may be connected to the control electrode of the first transistor T1 and the anode of the i-th light-emitting element OLEDi through the first and second nodes N1 and N2.

Figure 8:
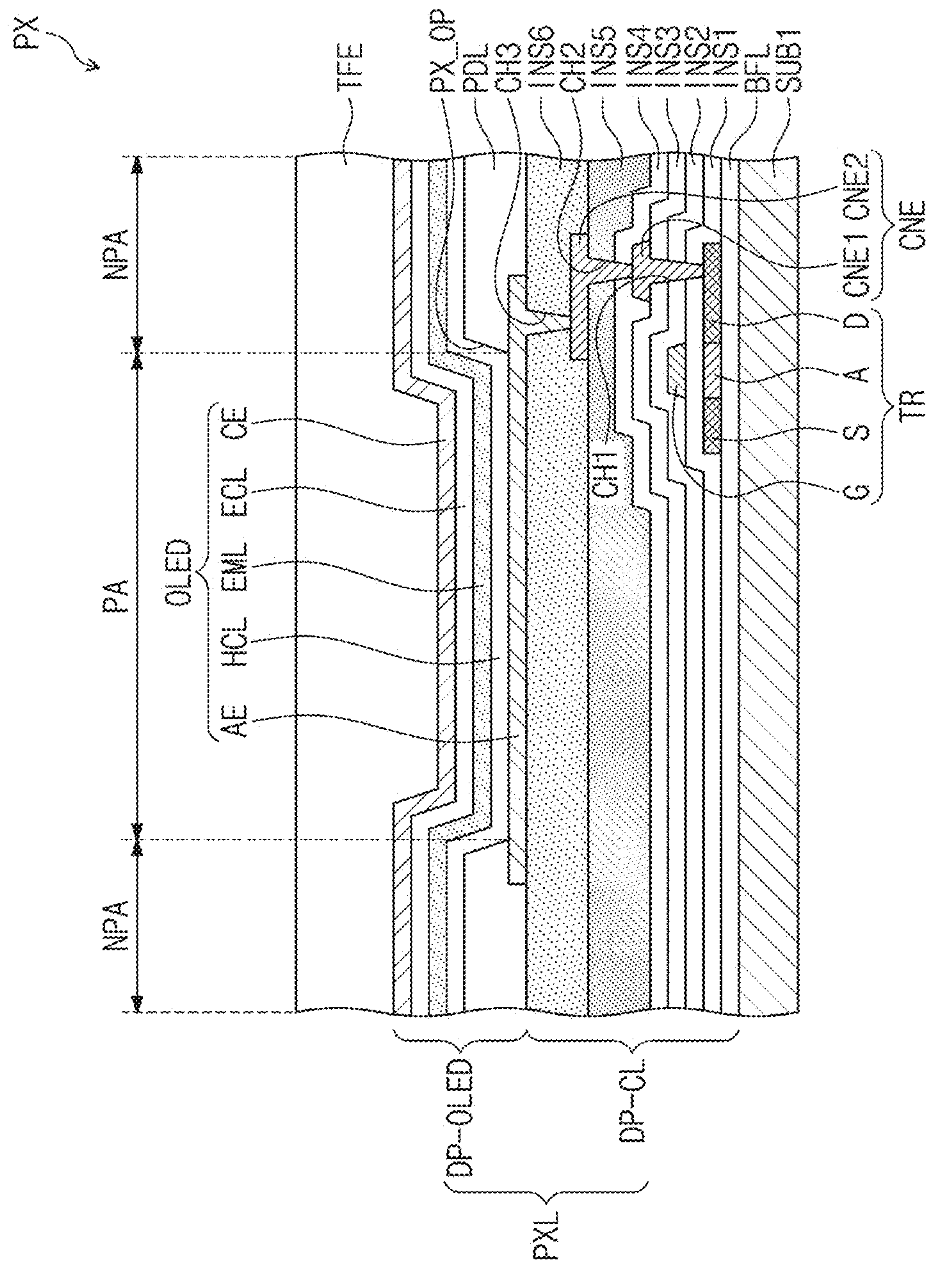
FIG. 8 is a diagram illustrating a cross-section of any one pixel illustrated in FIG. 5 as an example.

FIG. 8 is a diagram illustrating a cross-section of any one pixel illustrated in FIG. 5 as an example.

Referring to FIG. 8, the pixel PX may include a transistor TR and a light-emitting element OLED. The transistor TR may be the first transistor T1 illustrated in FIG. 7. The light-emitting element OLED may include a first electrode AE (e.g. an anode), a second electrode CE (e.g. a cathode), a hole control layer HCL, an electron control layer ECL, and an emission layer EML. The transistor TR and the light-emitting element OLED may be disposed on a first substrate SUB1.

A plane region of each of the pixels PX may include a light-emitting region PA and a non-light-emitting region NPA around the light-emitting region PA. The light-emitting element OLED may be disposed in the light-emitting region PA.

A buffer layer BFL may be disposed on the first substrate SUB1, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a heavily doped region and a lightly doped region. The heavily doped region may have higher conductivity than the lightly doped region and substantially serve as a source electrode and a drain electrode of the transistor TR. The lightly doped region may substantially correspond to an active (or channel) of the transistor.

A source region S, a channel region A, and a drain region D of the transistor TR may be formed from the semiconductor pattern. A first insulating layer INS1 may be disposed on the semiconductor pattern. A gate electrode G (or control electrode) of the transistor TR may be disposed on the first insulating layer INS1. A second insulating layer INS2 may be disposed on the gate electrode G. A third insulating layer INS3 may be disposed on the second insulating layer INS2.

A connection electrode CNE may be disposed between the transistor TR and the light-emitting element OLED and connect the transistor TR and the light-emitting element OLED. The connection electrode CNE may include a first connection electrode CNE1 and a second connection electrode CNE2 disposed on the first connection electrode CNE1. The first connection electrode CNE1 may be disposed on the third insulating layer INS3 and connected to the drain region D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL up to the sixth insulating layer INS6 may be defined as a circuit element layer DP-CL. The first insulating layer INS1 to the sixth insulating layer INS6 may each be an inorganic layer or an organic layer.

The first electrode AE may be disposed on the sixth insulating layer INS6. The first electrode AE may be connected to the second connection electrode CNE2 through a third contact hole CH3 defined in the sixth insulating layer INS6. A pixel-defining film PDL, in which an opening PX_OP for exposing a predetermined portion of the first electrode AE is defined, may be disposed on the first electrode AE and the sixth insulating layer INS6.

The hole control layer HCL may be disposed on the first electrode AE and the pixel-defining film PDL. The hole control layer HCL may be disposed in the light-emitting region LA and the non-light-emitting region NLA in common. The hole control layer HCL may include a hole transport layer and a hole injection layer.

The emission layer EML may be disposed on the hole control layer HCL. The emission layer EML may be disposed in the light-emitting region LA and the non-light-emitting region NLA in common. The emission layer EML may include an organic material and/or an inorganic material. The emission layer EML may generate blue light.

The electron control layer ECL may be disposed on the emission layer EML. The electron control layer ECL may include an electron transport layer and an electron injection layer. The electron control layer ECL may be disposed in the light-emitting region LA and the non-light-emitting region NLA in common.

The second electrode CE may be disposed on the electron control layer ECL. The second electrode CE may be disposed in the pixels PX in common.

Portions, which overlap the opening PX_OP, of the first and second electrodes AE and CE, a portion, which overlaps the opening PX_OP, of the emission layer EML, a portion, which overlaps the opening PX_OP, of the hole control layer HCL, and a portion, which overlaps the opening PX_OP, of the electron control layer ECL may be defined as the light-emitting element OLED.

A layer in which the light-emitting element OLED is disposed may be defined as a display element layer DP-OLED. The circuit element layer DP-CL and the display element layer DP-OLED may be defined as a pixel layer PXL.

A thin-film encapsulation layer TFE may be disposed on the second electrode CE and cover the pixel PX. The thin-film encapsulation layer TFE may include two inorganic layers and an organic layer between the inorganic layers. The inorganic layers may protect pixels from moisture/oxygen. The organic layer may protect pixels from foreign substances such as dust particles.

A first voltage may be applied to the first electrode AE through the transistor TR, and a second voltage having a lower level than the first voltage may be applied to the second electrode CE. A hole and an electron injected into the emission layer EML may be combined to form an exciton, and as the exciton transitions to a ground state, the light-emitting element OLED may emit light.

Figure 9:
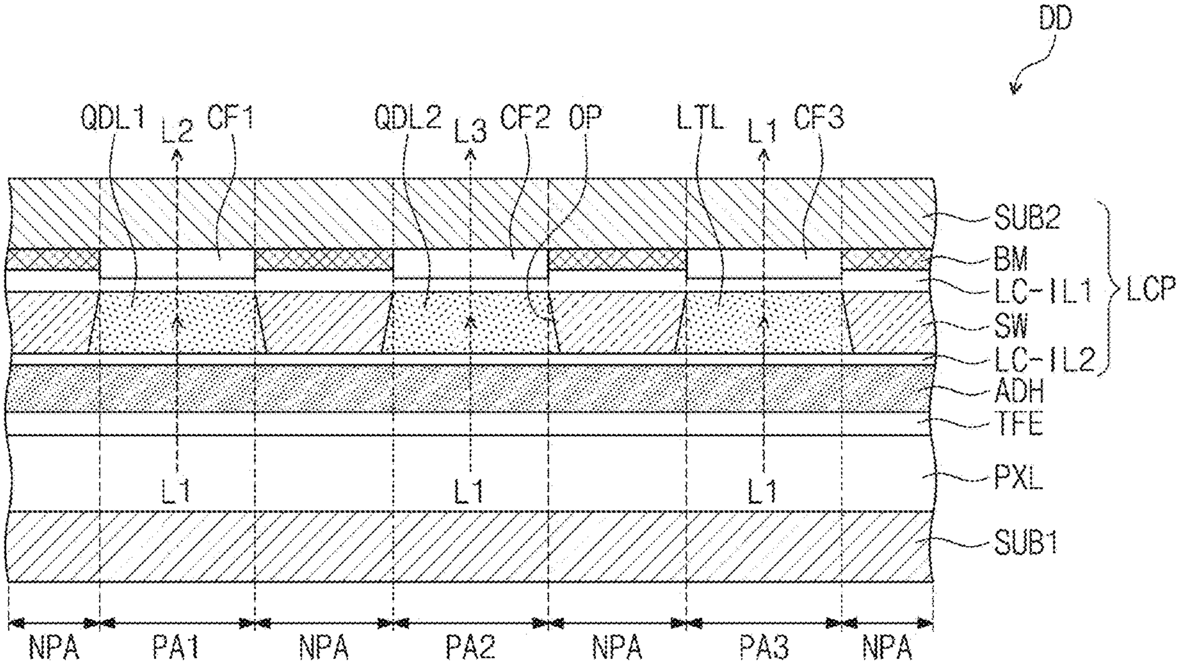
FIG. 9 is a diagram illustrating a cross-section of a light conversion part disposed on a pixel layer illustrated in FIG. 8 as an example.

FIG. 9 is a diagram illustrating a cross-section of a light conversion part disposed on the pixel layer illustrated in FIG. 8 as an example.

By way of example, FIG. 9 illustrates first, second, and third light-emitting regions PA1, PA2, and PA3, and the light-emitting region PA illustrated in FIG. 8 may be any one of the first, second, and third light-emitting regions PA1, PA2, and PA3. The first, second, and third light-emitting regions PA1, PA2, and PA3 may correspond to the first, second, and third pixels PX1, PX2, and PX3 illustrated in FIG. 6. For convenience of description, in FIG. 9, cross-sectional structures of the transistor TR and the light-emitting element OLED illustrated in FIG. 8 are not provided, and the pixel layer PXL is illustrated as a single layer.

Referring to FIG. 9, the display device DD may include a light conversion part LCP disposed on the thin-film encapsulation layer TFE. The light conversion part LCP may be attached to the thin-film encapsulation layer TFE through an adhesive layer ADH.

A region between the first, second, and third light-emitting regions PA1, PA2, and PA3 may be defined as a non-light-emitting region NPA. The first, second, and third light-emitting regions PA1, PA2, and PA3 may generate first light L1. By way of example, the first light L1 may be blue light.

The light conversion part LCP may include a second substrate SUB2, first and second quantum dot layers QDL1 and QDL2, a light transmission layer LTL, first, second, and third color filters CF1, CF2, and CF3, a black matrix BM, a partition wall layer SW, and first and second insulating layers LC-IL1 and LC-IL2. The first and second quantum dot layers QDL1 and QDL2, the light transmission layer LTL, the first, second, and third color filters CF1, CF2, and CF3, the black matrix BM, and the partition wall layer SW may be disposed between the second substrate SUB2 and the thin-film encapsulation layer TFE.

The first, second, and third color filters CF1, CF2, and CF3 and the black matrix BM may be disposed under the second substrate SUB2. The first, second, and third color filters CF1, CF2, and CF3 may overlap the first, second, and third light-emitting regions PA1, PA2, and PA3. The black matrix BM may overlap the non-light-emitting region NPA.

The first color filter CF1 may overlap the first light-emitting region PA1, the second color filter CF2 may overlap the second light-emitting region PA2, and the third color filter CF3 may overlap the third light-emitting region PA3. The first color filter CF1 may include a red color filter. The second color filter CF2 may include a green color filter. The third color filter CF3 may include a blue color filter.

The first insulating layer LC-IL1 may be disposed under the first, second, and third color filters CF1, CF2, and CF3 and the black matrix BM. The partition wall layer SW may be disposed under the first insulating layer LC-IL1.

Openings OP in which the first and second quantum dot layers QDL1 and QDL2 and the light transmission layer LTL are disposed may be defined in the partition wall layer SW. The openings OP may be around the first, second, and third light-emitting regions PA1, PA2, and PA3. The partition wall layer SW may overlap the non-light-emitting region NPA. The partition wall layer SW may have a black color, but a color of the partition wall layer SW is not limited thereto.

The first and second quantum dot layers QDL1 and QDL2 and the light transmission layer LTL may be disposed under the first insulating layer LC-IL1. The first and second quantum dot layers QDL1 and QDL2 and the light transmission layer LTL may be disposed in the openings OP.

The first and second quantum dot layers QDL1 and QDL2 and the light transmission layer LTL may overlap the first, second, and third light-emitting regions PA1, PA2, and PA3. The first quantum dot layer QDL1 may overlap the first light-emitting region PA1, the second quantum dot layer QDL2 may overlap the second light-emitting region PA2, and the light transmission layer LTL may overlap the third light-emitting region PA3.

The first light L1 generated in the first, second, and third light-emitting regions PA1, PA2, and PA3 may be provided to the first and second quantum dot layers QDL1 and QDL2 and the light transmission layer LTL. The first light L1 generated in the first light-emitting region PA1 may be provided to the first quantum dot layer QDL1, and the first light L1 generated in the second light-emitting region PA2 may be provided to the second quantum dot layer QDL2. The first light L1 generated in the third light-emitting region PA3 may be provided to the light transmission layer LTL.

The first quantum dot layer QDL1 may convert the first light L1 into second light L2. The second quantum dot layer QDL2 may convert the first light L1 into third light L3. By way of example, the second light L2 may be red light, and the third light L3 may be green light. The first quantum dot layer QDL1 may include first quantum dots (not illustrated), and the second quantum dot layer QDL2 may include second quantum dots (not illustrated). The light transmission layer LTL may include light-scattering particles (not illustrated) for scattering light.

The first quantum dots may convert the first light L1 having a blue wavelength band into the second light L2 having a red wavelength band. The second quantum dots may convert the first light L1 having a blue wavelength band into the third light L3 having a green wavelength band. The first and second quantum dots may scatter the second and third light L2 and L3. The light transmission layer LTL may transmit the first light L1 without performing a light converting operation. The light transmission layer LTL may scatter the first light L1 through the light-scattering particles and output the scattered light.

The first quantum dot layer QDL1 may output the second light L2, the second quantum dot layer QDL2 may output the third light L3, and the light transmission layer LTL may output the first light L1. Thus, a predetermined image may be displayed due to the second light L2, the third light L3, and the first light L1 which display red, green, and blue.

Part of the first light L1 may be transmitted through the first quantum dot layer QDL1 without being light-converted by the first quantum dots and may be provided to the first color filter CF1. That is, the first light L1 that is not converted into the second light L2 since the first light L1 is not in contact with the first quantum dots may be present. The first color filter CF1 may block light of a different color. The first light L1 that is not converted at the first quantum dot layer QDL1 may be blocked at the first color filter CF1 having a red color filter and thus may not be output upward.

Part of the first light L1 may be transmitted through the second quantum dot layer QDL2 without being light-converted by the second quantum dots and may be provided to the second color filter CF2. That is, the first light L1 that is not converted into the third light L3 since the first light L1 is not in contact with the second quantum dots may be present. The second color filter CF2 may block light of a different color. The first light L1 that is not converted at the second quantum dot layer QDL2 may be blocked at the second color filter CF2 having a green color filter and thus may not be output upward.

External light may be provided toward the display device DD. When the external light is reflected on the display panel DP and provided back to an external user, the user may view the external light as in the case of viewing light reflected from a mirror.

The first, second, and third color filters CF1, CF2, and CF3 may prevent external light reflection. For example, the first, second, and third color filters CF1, CF2, and CF3 may filter external light with red, green, and blue. That is, the first, second, and third color filters CF1, CF2, and CF3 may filter the external light with the same color as the second light L2, the third light L3, and the first light L1. In such a case, the external light may not be viewed by a user.

The black matrix BM may block unnecessary light in the non-light-emitting region NPA. The partition wall layer SW having a black color may also block unnecessary light in the non-light-emitting region NPA, which is a function similar to that of the black matrix BM.

Figure 10:
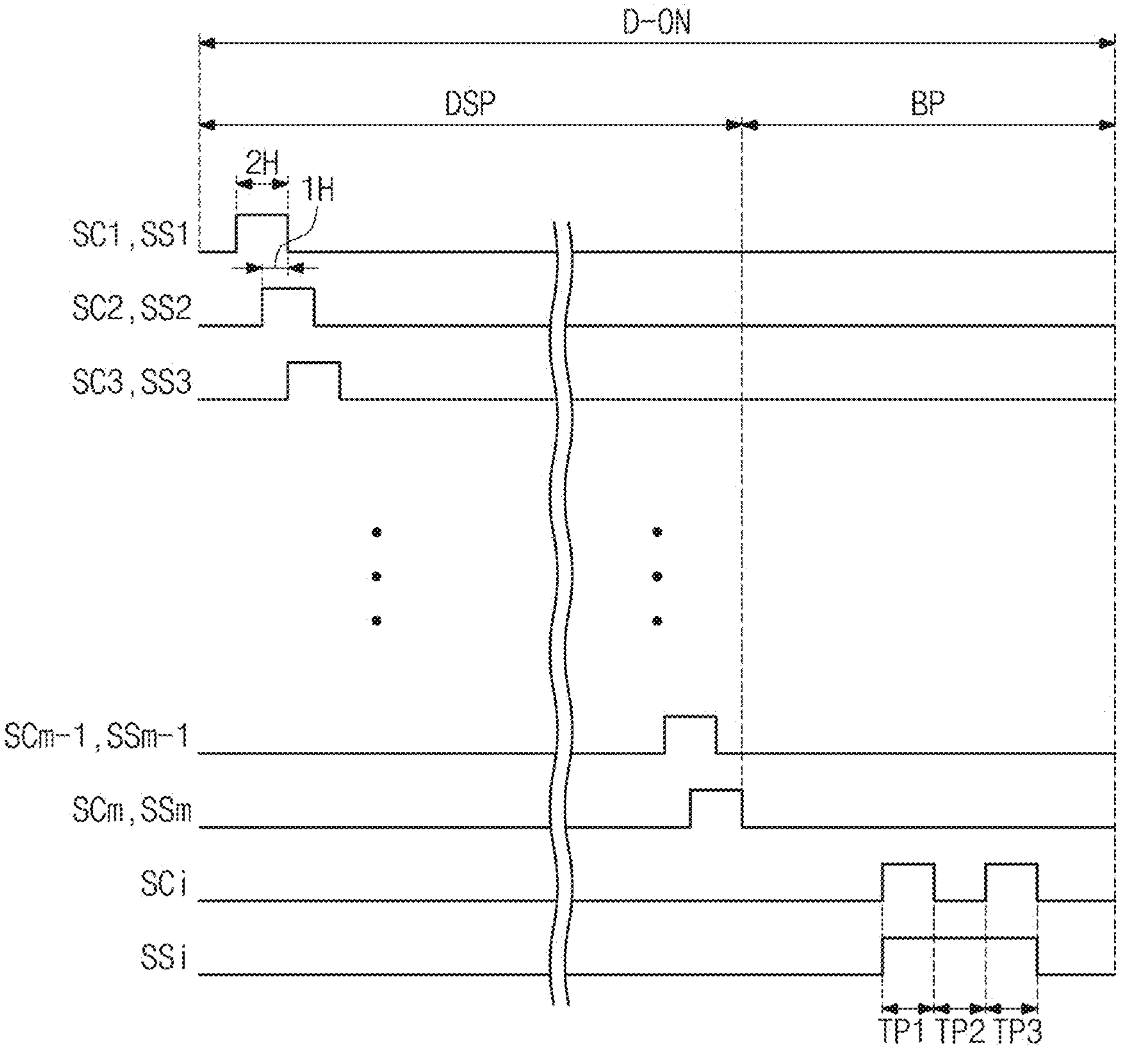
FIG. 10 is a timing diagram of scan signals applied to scan lines illustrated in FIG. 5.

FIG. 10 is a timing diagram of scan signals applied to the scan lines illustrated in FIG. 5.

Referring to FIG. 10, the scan driver SDV (as seen in FIG. 5) may generate a plurality of scan signals SC1 to SCm and SS1 to SSm, and the scan signals SC1 to SCm and SS1 to SSm may be applied to the pixels PX through the scan lines SL1 to SLm. The scan signals SC1 to SCm and SS1 to SSm may be sequentially output. Although not illustrated, the scan lines SL1 to SLm illustrated in FIG. 5 may each include a write scan line and a sampling scan line like the i-th scan line SLi illustrated in FIG. 7.

The scan signals SC1 to SCm and SS1 to SSm may include a plurality of write scan signals SC1 to SCm and a plurality of sampling scan signals SS1 to SSm.

The i-th write scan signal SCi illustrated in FIG. 7 may be one of the write scan signals among SC1 to SCm, and the i-th sampling scan signal SSi may be one of the sampling scan signals among SS1 to SSm.

The display device DD may display an image during a display-on period D-ON. The display-on period D-ON may include a display period DSP and a blank period BP following the display period DSP.

During the display period DSP, the scan signals SC1 to SCm and SS1 to SSm may be sequentially output. During the display period DSP, the write scan signals SC1 to SCm may be sequentially output, and the sampling scan signals SS1 to SSm may be sequentially output. During the display period DSP, a write scan signal and a sampling scan signal in the same order among the write scan signals SC1 to SCm and the sampling scan signals SS1 to SSm may be applied to the pixels PX at the same timing.

Hereinafter, in this specification, an activated state of a signal may be defined as a high level of the signal, and a deactivated state of a signal may be defined as a low level of the signal.

During the display period DSP, an activation period of each of the scan signals SC1 to SCm and SS1 to SSm may have 2H period. During the display period DSP, the scan signals SC1 to SCm and SS1 to SSm may overlap each other by 1H period. For example, and without limitation scan signal SC1 and SS1 may overlap scan signal SC2 and SS2 by 1H period and scan signal SC2 SS2 may overlap scan signal SC3 and SS3 by 1H period, etc.

For example, during the display period DSP, an (i+1)-th scan signal may partially overlap an i-th scan signal. During the display period DSP, an (i+1)-th write scan signal may overlap an i-th write scan signal by 1H period. In addition, during the display period DSP, an (i+1)-th sampling scan signal may overlap an i-th sampling scan signal by 1H period.

During the blank period BP, pixels PX disposed in any one row may be selected by the scan driver SDV, and any one write scan signal and any one sampling scan signal may be applied to the selected pixels PX.

By way of example, the i-th write scan signal SCi may be applied to the pixels PX connected to the i-th write scan line SCLi (see FIG. 6) through the i-th write scan line SCLi. The i-th sampling scan signal SSi may be applied to the pixels PX connected to the i-th sampling scan line SSLi through the i-th sampling scan line SSLi.

The blank period BP may include a first period TP1, a second period TP2, and a third period TP3 which are continuously set. For example, the first period TP1, the second period TP2, and the third period TP3 of the blanking may occur in succession. Here, aspects of the present disclosure are not limited to a specific order of periods in the blank period and the specific numbering is simply provided for delineation of elements and is not intended to describe order of operation. The i-th scan signals SCi and SSi may be applied to the pixels PX connected to the i-th scan line SLi during the first, second, and third periods TP1, TP2, and TP3.

The i-th write scan signal SCi may be activated during the first period TP1 and the third period TP3 and deactivated during the second period TP2. The i-th sampling scan signal SSi may be activated during the first, second, and third periods TP1, TP2, and TP3.

In an embodiment of the inventive concept, a defective pixel may be detected. During the blank period BP, a pixel PX disposed in a row preceding a row in which the defective pixel is disposed may be selected, and a write scan signal and a sampling scan signal may be applied to the selected pixel. Such an operation will be described below in detail.

Figure 11:
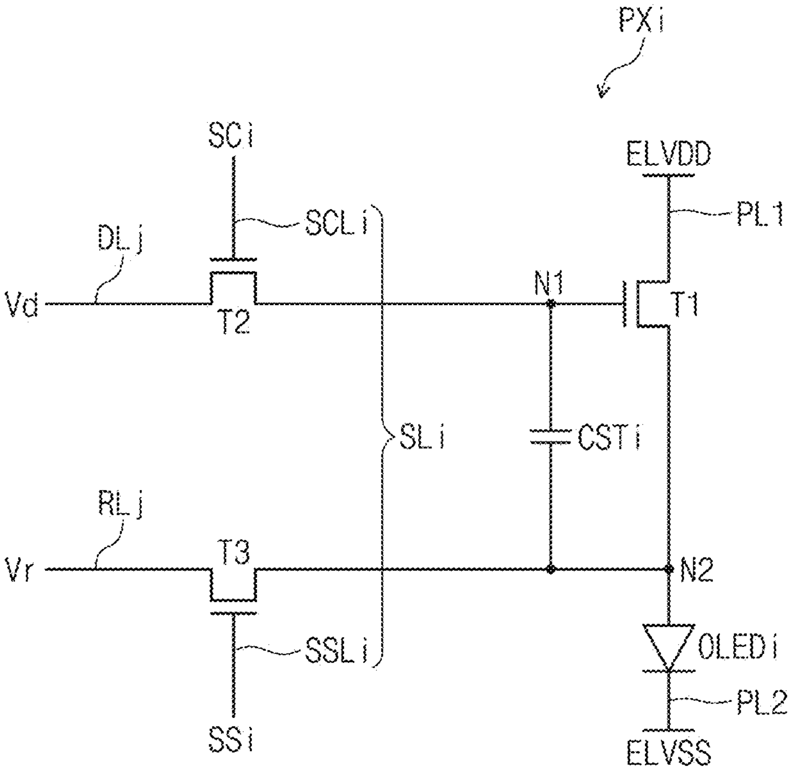
FIG. 11 is a diagram for describing an operation of a pixel in a display period illustrated in FIG. 10.
Figure 12A:
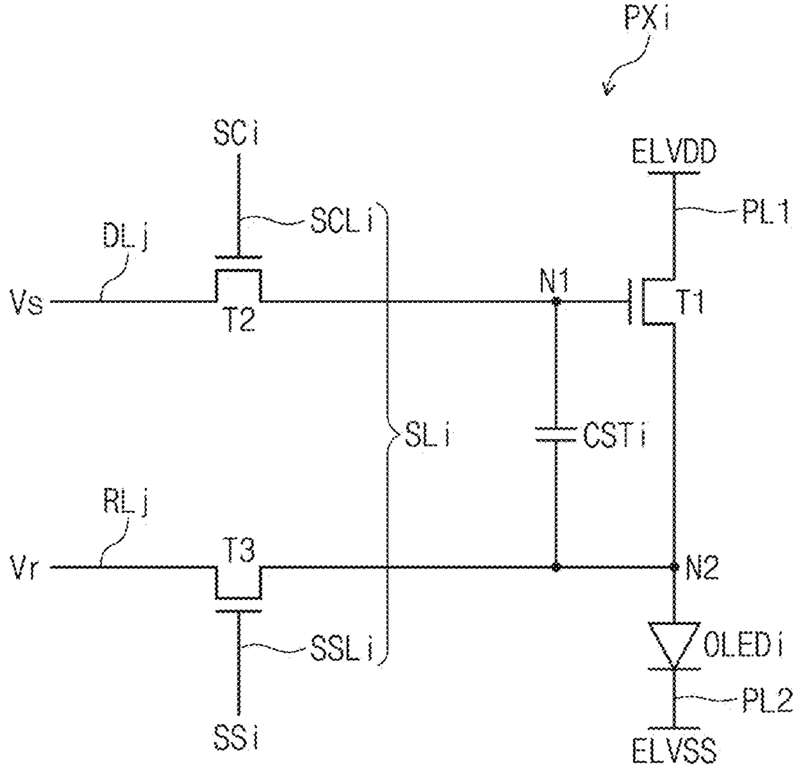
FIGS. 12A to 12C are diagrams for describing an operation of a pixel in first, second, and third periods illustrated in FIG. 10.
Figure 12B:
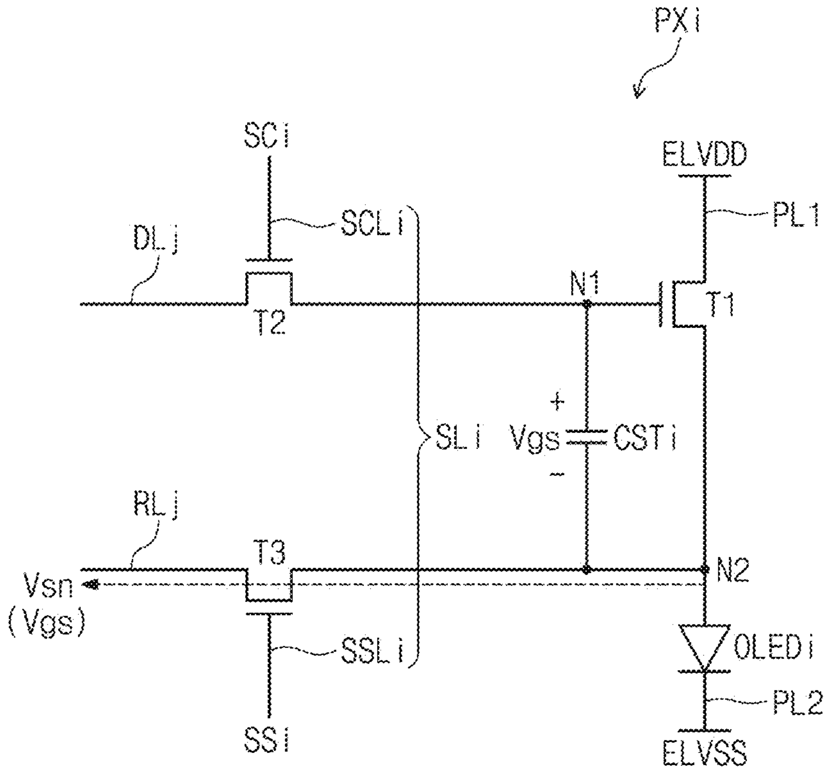
Figure 12C:
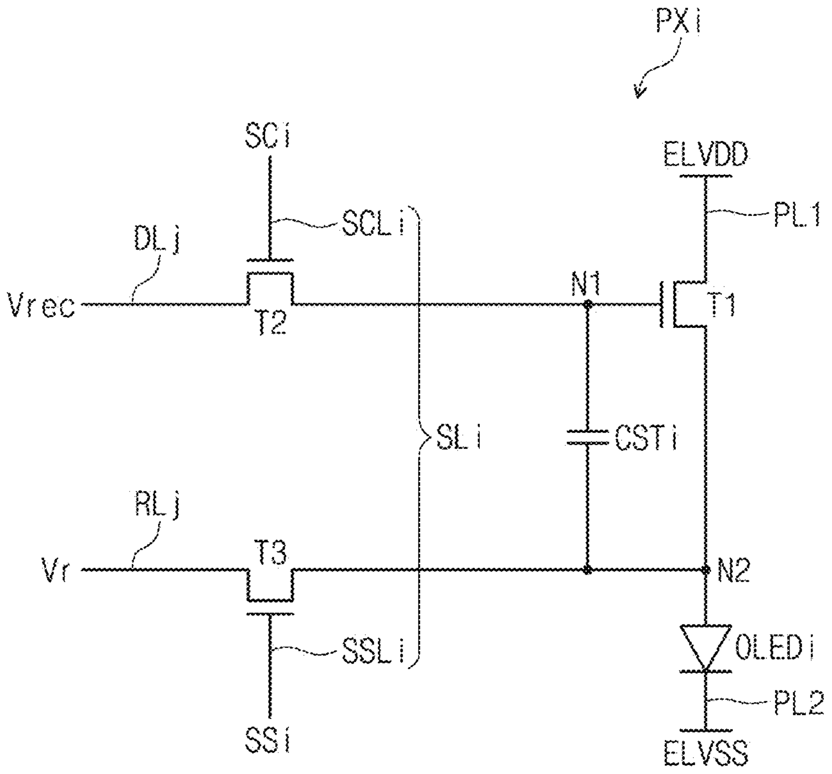

FIG. 11 is a diagram for describing an operation of a pixel in the display period illustrated in FIG. 10. FIGS. 12A to 12C are diagrams for describing an operation of a pixel in the first, second, and third periods illustrated in FIG. 10.

Hereinafter, an operation, in the display period DSP, of the i-th pixel PXi disposed in the i-th row illustrated in FIG. 7 will be described as an example, but other pixels PX that are not illustrated may operate in the same manner as the i-th pixel PXi.

Referring to FIGS. 10 and 11, during a program period of the display period DSP, the i-th write scan signal SCi and the i-th sampling scan signal SSi which are activated may be applied to the i-th pixel PXi. The second transistor T2 may be turned on in response to the i-th write scan signal SCi, and the third transistor T3 may be turned on in response to the i-th sampling scan signal SSi.

During the display period DSP, the j-th data line DLj may receive the data voltage Vd. The data voltage Vd may be applied to the control electrode (or gate electrode) of the first transistor T1 through the j-th data line DLj.

During the display period DSP, the h-th reference line RLh may receive the reference voltage Vr. The reference voltage Vr may be applied to the second electrode (or source electrode) of the first transistor T1 through the h-th reference line RLh.

The control electrode of the first transistor T1 may be connected to the first node N1, and the second electrode of the first transistor T1 may be connected to the second node N2. Thus, a voltage between the first node N1 and the second node N2 may be set as a difference between the data voltage Vd and the reference voltage Vr.

A charge corresponding to a difference between the data voltage Vd and the reference voltage Vr may be stored in the i-th capacitor CSTi. Thus, during a program period, a voltage between the first node N1 and the second node N2 may be set in accordance with desired pixel current. A voltage between the first node N1 and the second node N2 may be defined as a gate-source voltage.

During an emission period after the program period, the i-th write scan signal SCi and the i-th sampling scan signal SSi may be deactivated, and the second and third transistors T2 and T3 may be turned off. A voltage between the first node N1 and the second node N2 may be maintained by the i-th capacitor CSTi.

Since a voltage between the first node N1 and the second node N2 is greater than a threshold voltage of the first transistor T1, pixel current may flow in the first transistor T1 during the emission period. Due to pixel current, during the emission period, a potential of the first node N1 and a potential of the second node N2 may be boosted while a voltage between the first node N1 and the second node N2 is maintained. When a potential of the second node N2 is boosted up to an operating point level of the i-th light-emitting element OLEDi, the i-th light-emitting element OLEDi may emit light.

In the display period DSP, the scan signals SC1 to SCm and SS1 to SSm may be sequentially applied to the pixels PX, and the pixels PX may operate like the i-th pixel PXi.

Referring to FIGS. 10 and 12A, during the first period TP1, the i-th write scan signal SCi and the i-th sampling scan signal SSi which are activated may be applied to the selected i-th pixel PXi. The second transistor T2 and the third transistor T3 may be turned on by the i-th write scan signal SCi and the i-th sampling scan signal SSi.

During the first period TP1, the j-th data line DLj may receive the data voltage Vs for sensing. The data voltage Vs for sensing may be applied to the control electrode of the first transistor T1 through the j-th data line DLj.

During the first period TP1, the h-th reference line RLh may receive the reference voltage Vr. The reference voltage Vr may be provided to the second electrode of the first transistor T1 through the h-th reference line RLh. Thus, a voltage between the first node N1 and the second node N2 may be set so as to match desired sensing pixel current.

Referring to FIGS. 10 and 12B, during the second period TP2, the i-th write scan signal SCi may be deactivated, and the i-th sampling scan signal SSi may maintain an activated state. The second transistor T2 may be turned off, and the third transistor T3 may maintain a turned-on state.

A gate-source voltage Vgs of the first transistor T1 may be sensed according to the data voltage Vs for sensing and the reference voltage Vr. The sensed gate-source voltage Vgs may be defined as a sensing voltage Vsn. The sensing voltage Vsn may be provided to the data driver DDV through the h-th reference line RLh. The sensing voltage Vsn may be provided to the timing controller T-CON through the data driver DDV. Driving characteristics of the i-th pixel PXi may be sensed using the gate-source voltage Vgs.

The sensed gate-source voltage Vgs may substantially correspond to sensing pixel current flowing through the first transistor T1. Sensing pixel current may be calculated using the sensed gate-source voltage Vgs.

Referring to FIGS. 10 and 12C, during the third period TP3, the i-th write scan signal SCi may be activated, and the i-th sampling scan signal SSi may maintain an activated state. The second transistor T2 may be turned on, and the third transistor T3 may maintain a turned-on state.

During the third period TP3, the j-th data line DLj may receive a restoration data voltage Vrec, and the h-th reference line RLh may receive the reference voltage Vr. The restoration data voltage Vrec may be applied to the control electrode of the first transistor T1, and the reference voltage Vr may be applied to the second electrode of the first transistor T1. The restoration data voltage Vrec may have substantially the same level as the reference voltage Vr. Thus, during the third period TP3, the i-th pixel PXi may be initialized and may not emit light.

Figure 13:
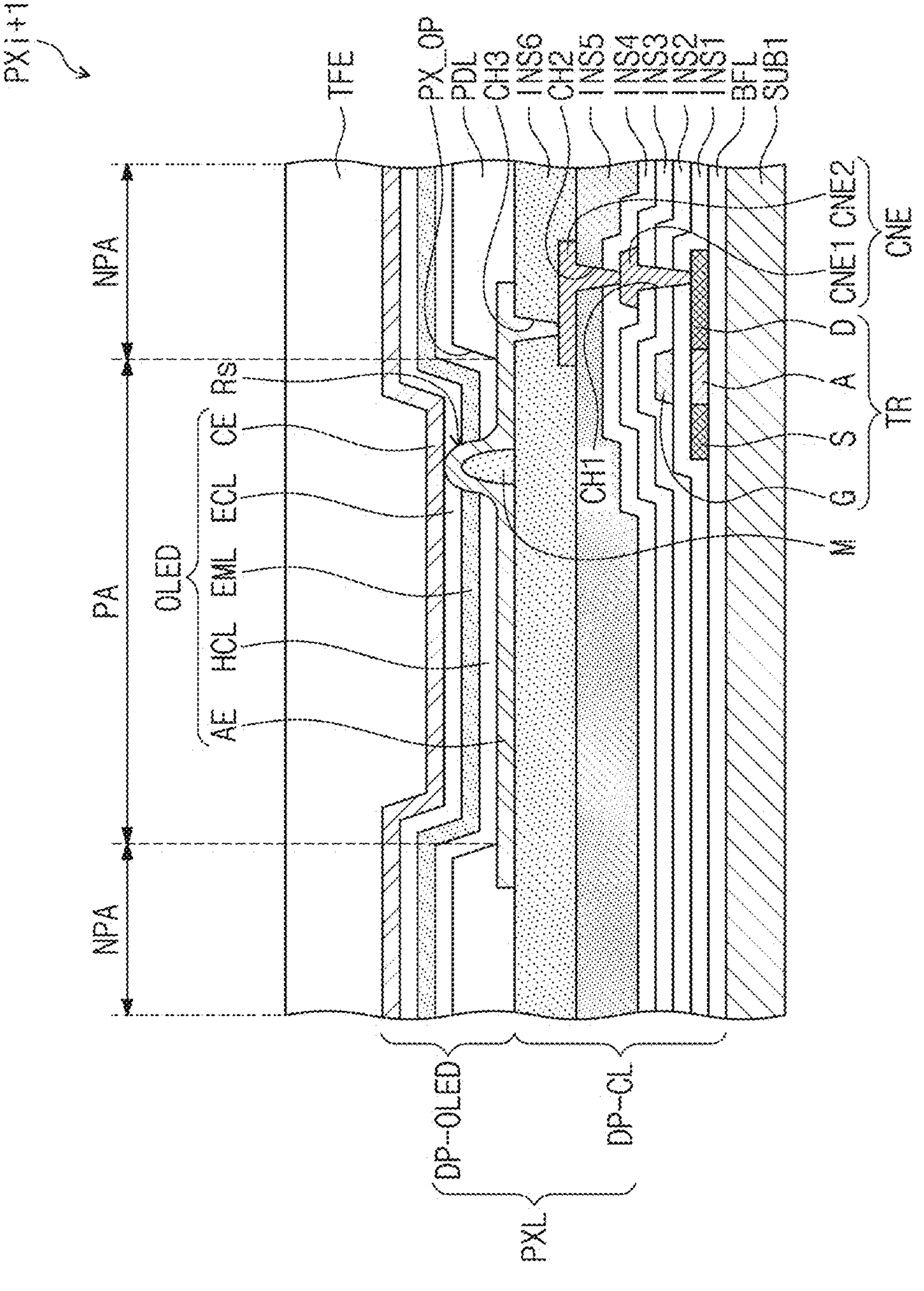
FIG. 13 is a diagram illustrating a configuration of a cross-section of a defective pixel in which a defect occurs as an example.

FIG. 13 is a diagram illustrating a configuration of a cross-section of a defective pixel in which a defect occurs as an example.

Referring to FIG. 13, an (i+1)-th pixel PXi+1 may be defined as a pixel PX disposed in an (i+1)-th row. A first electrode AE and a second electrode CE may be short-circuited in the (i+1)-th pixel PXi+1. For example, when a foreign substance M is disposed on a sixth insulating layer INS6, a portion, of the first electrode AE, disposed on the foreign substance M may protrude upward and may be in contact with the second electrode CE. In such a case, the (i+1)-th pixel PXi+1 may include short-circuit resistance Rs which is formed since a portion of the first electrode AE and a portion of the second electrode CE are short-circuited.

The (i+1)-th pixel PXi+1 including the short-circuit resistance Rs may be defined as a defective pixel. A defective pixel may affect an operation of a neighboring pixel.

Figure 14:
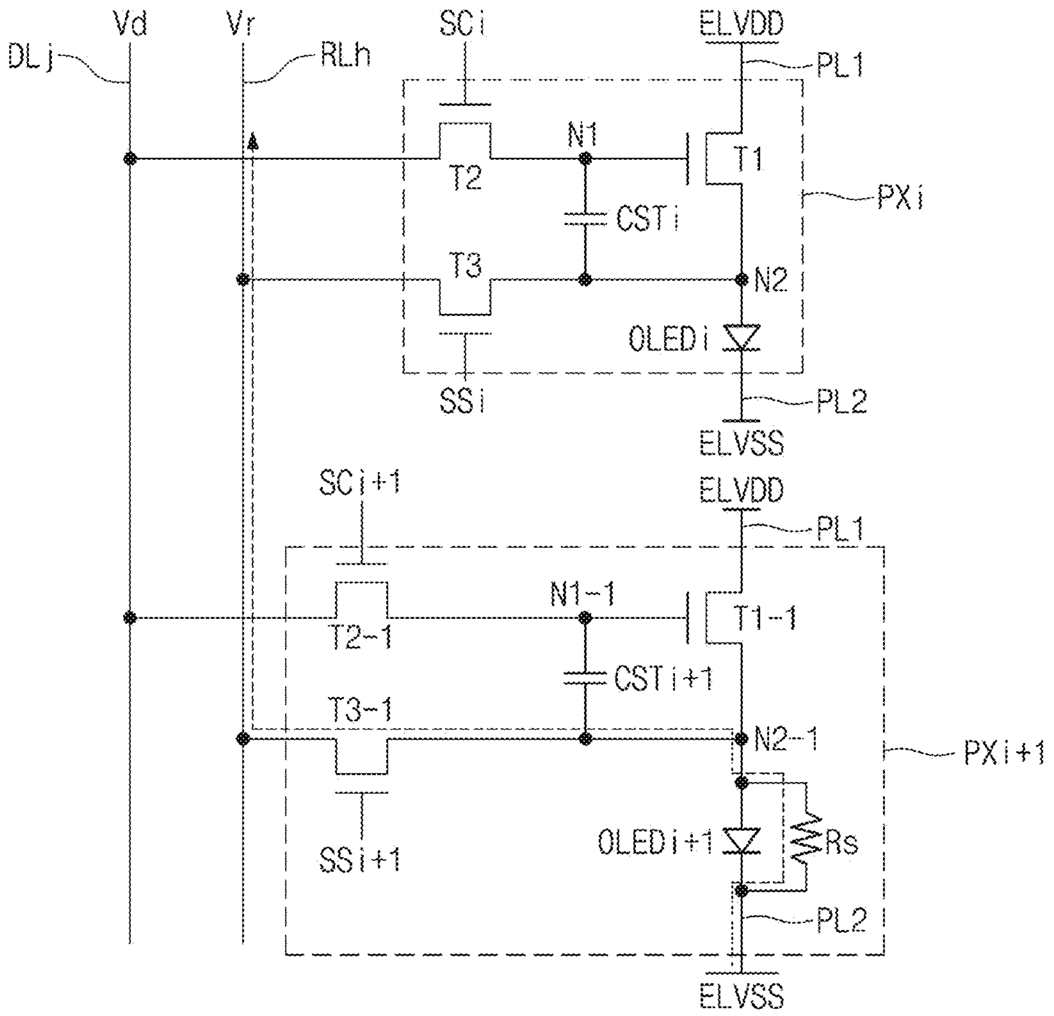
FIG. 14 is a circuit diagram for describing an operation, during a display period, of an i-th pixel disposed in an i-th row and an (i+1)-th pixel disposed in an (i+1)-th row.
Figure 15:
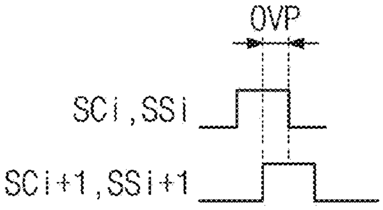
FIG. 15 is a timing diagram of an i-th scan signal and an (i+1)-th scan signal applied to the i-th pixel and the (i+1)-th pixel illustrated in FIG. 14.

FIG. 14 is a circuit diagram for describing an operation, during a display period, of an i-th pixel disposed in an i-th row and an (i+1)-th pixel disposed in an (i+1)-th row. FIG. 15 is a timing diagram of an i-th scan signal and an (i+1)-th scan signal applied to the i-th pixel and the (i+1)-th pixel illustrated in FIG. 14.

By way of example, the (i+1)-th pixel PXi+1 illustrated in FIG. 14 may be the defective pixel illustrated in FIG. 13.

Referring to FIG. 14, the (i+1)-th pixel PXi+1 may be connected to the j-th data line DLj, the h-th reference line RLh, an (i+1)-th write scan line SCLi+1, and an (i+1)-th sampling scan line SSLi+1. The (i+1)-th write scan line SCLi+1 may receive an (i+1)-th write scan signal SCi+1. The (i+1)-th sampling scan line SSLi+1 may receive an (i+1)-th sampling scan signal SSi+1.

The (i+1)-th pixel PXi+1 may include a (1-1)-th transistor T1-1, a (2-1)-th transistor T2-1, a (3-1)-th transistor T3-1, an (i+1)-th capacitor CSTi+1, an (i+1)-th light-emitting element OLEDi+1, and the short-circuit resistance Rs. The (i+1)-th pixel PXi+1 may have the same circuit configuration as the i-th pixel PXi except for the short-circuit resistance Rs. Brief description of a configuration of connection between elements of the (i+1)-th pixel PXi+1 is as follows.

The (1-1)-th transistor T1-1 may include a first electrode connected to the first power line PL1, a control electrode connected to a (1-1)-th node N1-1, and a second electrode connected to a (2-1)-th node N2-1. The (2-1)-th transistor T2-1 may include a first electrode connected to the j-th data line DLj, a second electrode connected to the (1-1)-th node N1-1, and a control electrode connected to the (i+1)-th write scan line SCLi+1. The (3-1)-th transistor T3-1 may include a first electrode connected to the h-th reference line RLh, a second electrode connected to the (2-1)-th node N2-1, and a control electrode connected to the (i+1)-th sampling scan line SSLi+1.

The (i+1)-th light-emitting element OLEDi+1 may include an anode connected to the (2-1)-th node N2-1 and a cathode connected to the second power line PL2. The (i+1)-th capacitor CSTi+1 may include a first electrode connected to the (1-1)-th node N1-1 and a second electrode connected to the (2-1)-th node N2-1. As described above, the short-circuit resistance Rs may be formed since the first electrode AE and the second electrode CE are short-circuited.

Referring to FIGS. 14 and 15, during the display period DSP, the i-th scan signals SCi and SSi and (i+1)-th scan signals SCi+1 and SSi+1 may be sequentially applied to the i-th pixel PXi and the (i+1)-th pixel PXi+1, respectively. As described above, the (i+1)-th scan signals SCi+1 and SSi+1 may partially overlap the i-th scan signals SCi and SSi.

According to the operation described with reference to FIG. 11, during the display period DSP, the i-th pixel PXi may receive the data voltage Vd and the reference voltage Vr in response to the i-th scan signals SCi and SSi. For example, during the display period DSP, the i-th pixel PXi may receive the data voltage Vd in response to the i-th write scan signal SCi and receive the reference voltage Vr in response to the i-th sampling scan signal SSi. Thus, the i-th pixel PXi may emit light as described with reference to FIG. 11.

Similar to the i-th pixel PXi, during the display period DSP, the (i+1)-th pixel PXi+1 may also receive the data voltage Vd and the reference voltage Vr in response to the (i+1)-th scan signals SCi+1 and SSi+1. The (i+1)-th scan signals SCi+1 and SSi+1 may include the (i+1)-th write scan signal SCi+1 and the (i+1)-th sampling scan signal SSi+1. The (i+1)-th write scan signal SCi+1 and the (i+1)-th sampling scan signal SSi+1 may be applied to the (i+1)-th pixel PXi+1 at the same timing.

The (i+1)-th pixel PXi+1 may receive the data voltage Vd in response to the (i+1)-th write scan signal SCi+1 and receive the reference voltage Vr in response to the (i+1)-th sampling scan signal SSi+1. However, since driving current flows to the short-circuit resistance Rs in the (i+1)-th pixel PXi+1, the (i+1)-th light-emitting element OLEDi+1 may not emit light.

A period of the (i+1)-th scan signals SCi+1 and SSi+1 overlapping the i-th scan signals SCi and SSi may be defined as an overlapping period OVP. When the i-th pixel PXi is driven, the (i+1)-th sampling scan signal SSi+1 may be applied to the (i+1)-th pixel PXi+1 during the overlapping period OVP, and the (3-1)-th transistor T3-1 may be turned on. The second voltage ELVSS may be applied to the h-th reference line RLh through the short-circuit resistance Rs and the turned-on (3-1)-th transistor T3-1.

During the blank period BP, the second voltage ELVSS may have a lower voltage level than the reference voltage Vr. The second voltage ELVSS may be applied to the h-th reference line RLh, and a level of the reference voltage Vr may be changed. For example, a level of the reference voltage Vr may be lowered to a level of the second voltage ELVSS. That is, a level of the reference voltage Vr may be lowered to a level of the second voltage ELVSS by the (i+1)-th pixel PXi+1 including the short-circuit resistance Rs.

Thus, a voltage drop phenomenon may occur at the second node N2, and a gate-source voltage of the first transistor T1 may increase. Since a gate-source voltage of the first transistor T1 increases, the i-th light-emitting element OLEDi may emit light with higher luminance than normal luminance.

The i-th light-emitting element OLEDi may emit light with higher luminance than normal luminance and may be viewed as a bright spot pixel. In such a case, a luminance difference between the (i+1)-th light-emitting element OLEDi+1 which does not emit light and the i-th light-emitting element OLEDi which emits light with high luminance may increase, and such a luminance difference may be viewed by a user. When the first, second, and third pixels PX1, PX2, and PX3 illustrated in FIG. 6 are pixels disposed in the i-th row, the first, second, and third pixels PX1, PX2, and PX3 may be viewed as bright spot pixels.

In an embodiment of the inventive concept, an increased amount of luminance of the i-th light-emitting element OLEDi may be easily detected during the blank period BP, and such an operation will be described below in detail.

Figure 16:
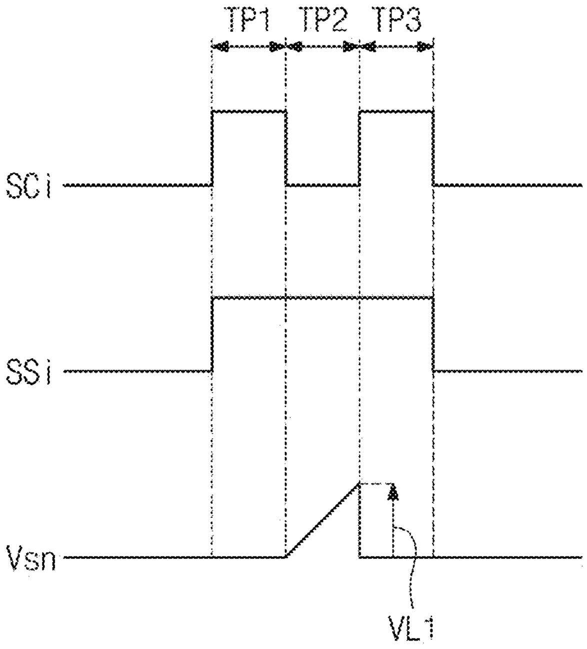
FIG. 16 is a timing diagram of an i-th scan signal applied to an i-th pixel and a sensing voltage output through an h-th reference line during a blank period in a case in which an (i+1)-th pixel is a normal pixel.

FIG. 16 is a timing diagram of an i-th scan signal applied to an i-th pixel and a sensing voltage output through an h-th reference line during a blank period in a case in which an (i+1)-th pixel is a normal pixel.

Referring to FIG. 16, according to the operation described with reference to FIGS. 12A to 12C, the sensing voltage Vsn sensed in the i-th pixel PXi may be output through the h-th reference line RLh. By way of example, the sensing voltage Vsn may be charged to a first voltage level VL1 and output.

Figure 17A:
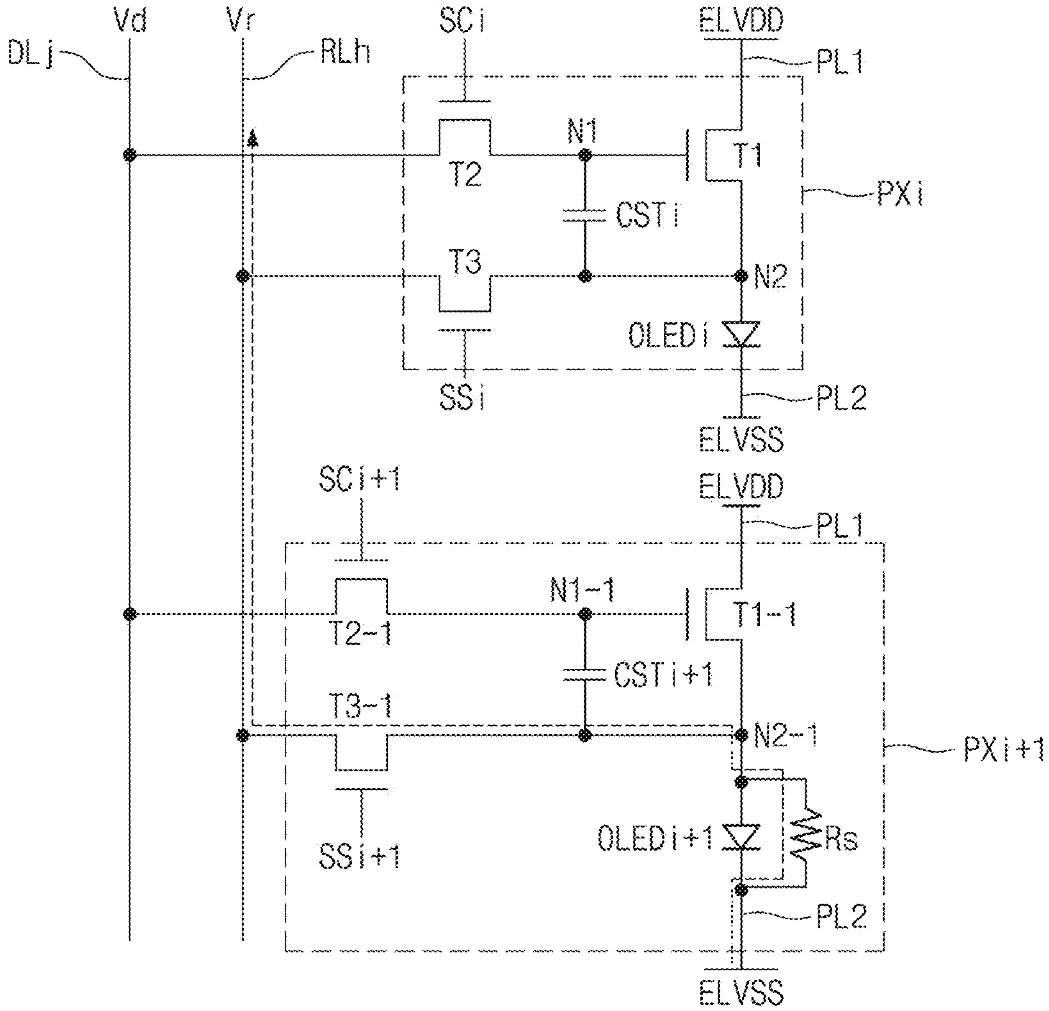
FIGS. 17A and 17B are diagrams for describing an operation of an i-th pixel and an (i+1)-th pixel in a first period and a second period in a case in which the (i+1)-th pixel is a defective pixel.
Figure 17B:
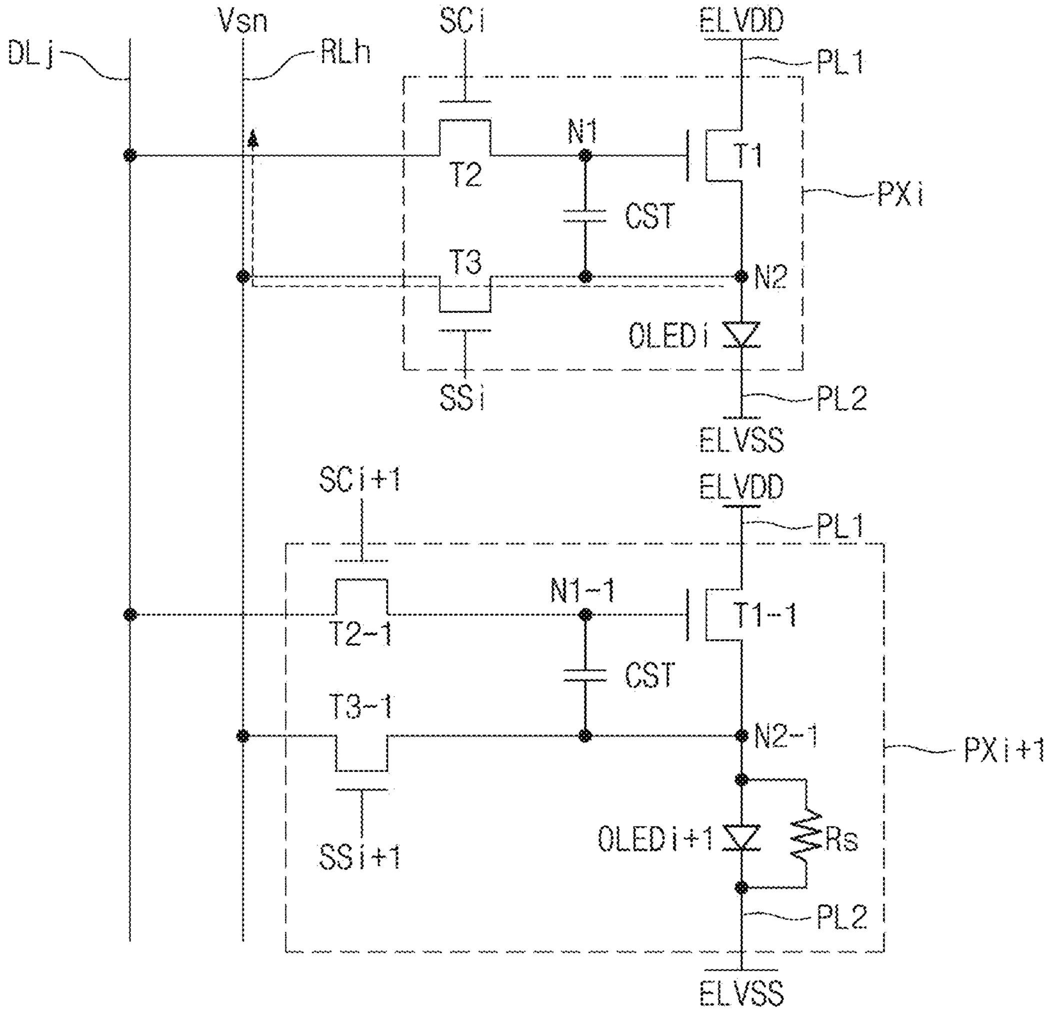
Figure 18:
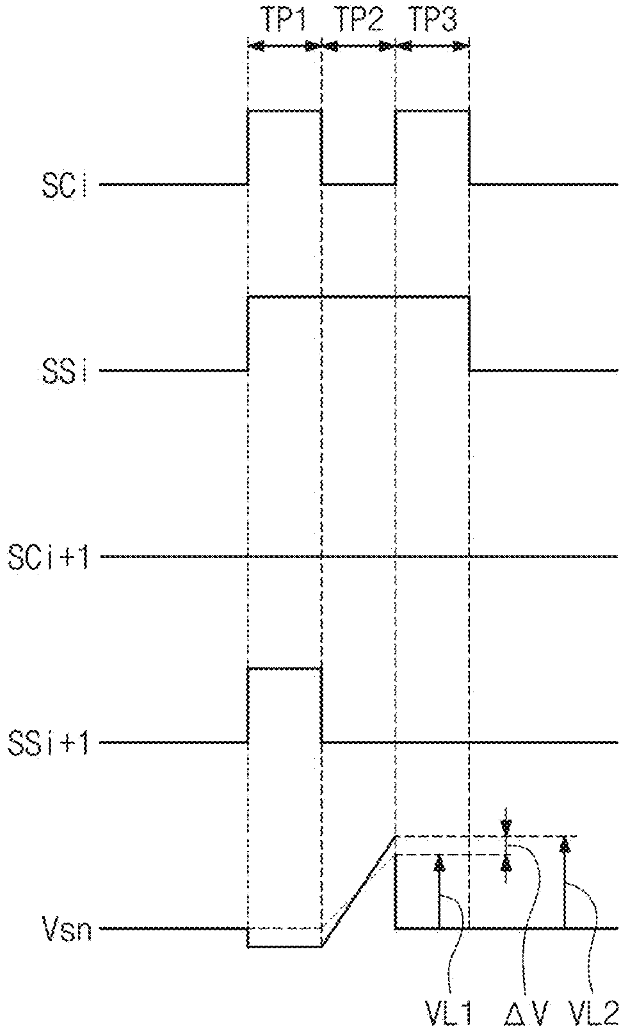
FIG. 18 is a timing diagram of an i-th scan signal applied to an i-th pixel, an (i+1)-th scan signal applied to an (i+1)-th pixel, and a sensing voltage during a blank period in a case in which the (i+1)-th pixel is a defective pixel.

FIGS. 17A and 17B are diagrams for describing an operation of an i-th pixel and an (i+1)-th pixel in a first period and a second period in a case in which the (i+1)-th pixel is a defective pixel. FIG. 18 is a timing diagram of an i-th scan signal applied to an i-th pixel, an (i+1)-th scan signal applied to an (i+1)-th pixel, and a sensing voltage during a blank period in a case in which the (i+1)-th pixel is a defective pixel.

By way of example, FIG. 18 illustrates the sensing voltage Vsn illustrated in FIG. 16 in a dashed line.

Referring to FIGS. 17A, 17B, and 18, the i-th scan signals SCi and SSi may be applied to the i-th pixel PXi during the first to third periods TP1, TP2, and TP3, and the (i+1)-th scan signal SSi+1 may be applied to the (i+1)-th pixel PXi+1.

Specifically, the i-th write scan signal SCi may be activated during the first period TP1 and the third period TP3 and applied to the i-th pixel PXi. The i-th sampling scan signal SSi may be applied to the i-th pixel PXi during the first to third periods TP1, TP2, and TP3. The (i+1)-th sampling scan signal SSi+1 of the (i+1)-th scan signals SCi+1 and SSi+1 may be activated during the first period TP1 and applied to the (i+1)-th pixel PXi+1.

Referring to FIGS. 17A and 18, during the first period TP1, the i-th pixel PXi may receive the data voltage Vs for sensing in response to the i-th write scan signal SCi and receive the reference voltage Vr in response to the i-th sampling scan signal SSi.

During the first period TP1, the (i+1)-th pixel PXi+1 may be connected to the h-th reference line RLh by the (3-1)-th transistor T3-1 that is turned on in response to the (i+1)-th sampling scan signal SSi. The short-circuit resistance Rs may be connected to the h-th reference line RLh through the turned-on (3-1)-th transistor T3-1.

The second voltage ELVSS may be applied to the h-th reference line RLh through the short-circuit resistance Rs and the turned-on (3-1)-th transistor T3-1. As a result, a level of the reference voltage Vr may be changed and lowered to a level of the second voltage ELVSS. That is, a level of the reference voltage Vr may be changed by the (i+1)-th pixel PXi+1 during the first period TP1, and specifically, a level of the reference voltage Vr may be lowered. Since a level of the reference voltage Vr is lowered, the gate-source voltage Vgs of the first transistor T1 may increase, similar to the operation in the display period DSP of FIG. 14.

Referring to FIGS. 17B and 18, during the second period TP2, the sensing voltage Vsn sensed in the i-th pixel PXi according to the data voltage Vs for sensing, the reference voltage Vr, and the short-circuit resistance Rs may be output through the h-th reference line RLh. Since the gate-source voltage Vgs of the first transistor T1 increases, the sensing voltage Vsn may be charged to a second voltage level VL2 higher than the first voltage level VL1 and output.

As described with reference to FIG. 14, during the display period DSP, the i-th pixel PXi may emit light with higher luminance than normal luminance according to the second voltage ELVSS applied to the h-th reference line RLh through the short-circuit resistance Rs. In an embodiment of the inventive concept, during the blank period BP for sensing characteristics of the i-th pixel PXi, the (i+1)-th pixel PXi+1 may be connected to the h-th reference line RLh, and the sensing voltage Vsn of which a voltage level is increased due to an effect of the short-circuit resistance Rs may be output.

A difference value ΔV between the first voltage level VL1 and the second voltage level VL2 may substantially correspond to an increased amount of luminance of the i-th pixel PXi according to an effect of the (i+1)-th pixel PXi+1 which is a defective pixel in the display period DSP.

The sensing voltage Vsn may be provided to the data driver DDV through the h-th reference line RLh during the second period TP2. The sensing voltage Vsn may be provided to the timing controller T-CON through the data driver DDV.

The timing controller T-CON may compensate the data voltage Vd applied to the i-th pixel PXi on the basis of the sensing voltage Vsn. For example, the timing controller T-CON may reduce a level of the data voltage Vd by a value corresponding to a difference value between the first voltage level VL1 and the second voltage level VL2 and output the data voltage Vd. Thus, the luminance of the i-th pixel PXi may be reduced to a normal level. As a result, the i-th pixel PXi may not be viewed as a bright spot. In addition, a luminance difference between the i-th pixel PXi and the (i+1)-th pixel PXi+1 may be reduced.

The (i+1)-th write scan signal SCi+1 may be deactivated during the first to third periods TP1 to TP3. The (i+1)-th sampling scan signal SSi+1 may be deactivated during the second and third periods TP2 and TP3.

Figure 19:
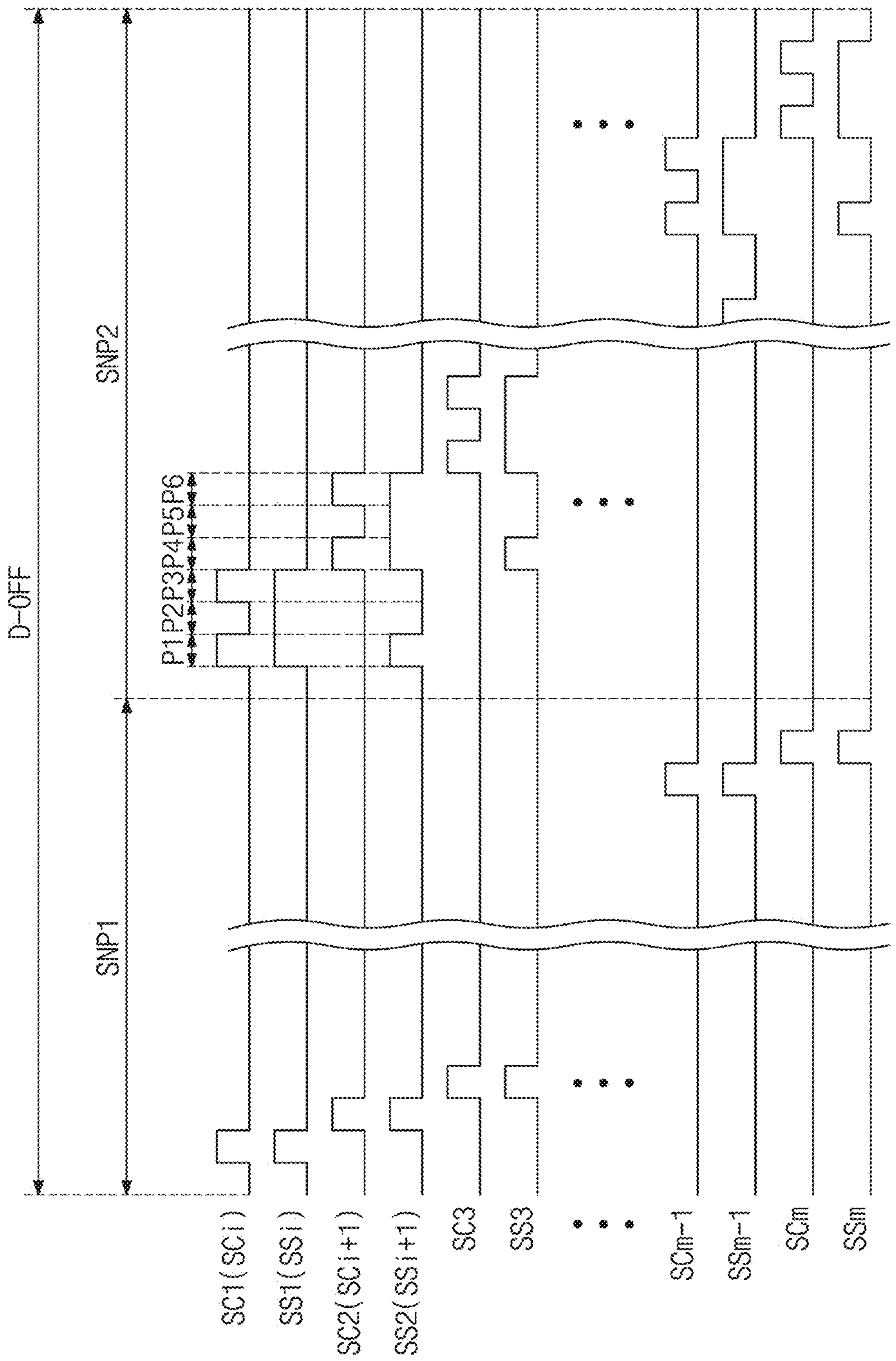
FIG. 19 is a timing diagram of signals in a display-off period before a display-on period illustrated in FIG. 10.

FIG. 19 is a timing diagram of signals in a display-off period before the display-on period illustrated in FIG. 10. For the sake of clarity when discussing the periods occurring during the display off period (P1-P6) shown in FIG. 19 and periods occurring during the display-on period (P1-P3) shown in FIG. 10, the Periods P1 through P6 occurring during the display-off period (P1-P6) may be referred to as the fourth period through ninth period. E.g. The first period is the first period in the display-on period, and the fourth period is the first period of the second sensing period in the display-off period, the second period is the second period occurring in the display-on period and the fifth period is the second period occurring during the second sensing period of the display-off period and so on.

Referring to FIG. 19, the display device DD may not display an image during a display-off period D-OFF. However, power may be supplied to the display device DD, and a sensing operation on the pixels PX of the display device DD may be performed.

The display-off period D-OFF may include a first sensing period SNP1 and a second sensing period SNP2. The scan signals SC1 to SCm and SS1 to SSm may be sequentially output during the first sensing period SNP1.

Referring to the i-th pixel PXi and the (i+1)-th pixel PXi+1 described above as an example, the i-th scan signals SCi and SSi and the (i+1)-th scan signals SCi+1 and SSi+1 may be sequentially applied to the i-th pixel PXi and the (i+1)-th pixel PXi+1, respectively, during the first sensing period SNP1. A falling edge of the i-th scan signals SCi and SSi and a rising edge of the (i+1)-th scan signals SCi+1 and SSi+1 may overlap. Unlike the timing diagram illustrated in FIG. 10, a state in which only a falling edge and a rising edge overlap may be defined as a non-overlapping state.

The i-th write scan signal SCi and the i-th sampling scan signal SSi may be applied to the i-th pixel PXi at the same timing during the first sensing period SNP1. The (i+1)-th write scan signal SCi+1 and the (i+1)-th sampling scan signal SSi+1 may be applied to the (i+1)-th pixel PXi+1 at the same timing during the first sensing period SNP1.

The scan signals illustrated in FIG. 10 may be sequentially applied to the pixels PX in all rows during the second sensing period SIP2. Specifically, the second sensing period SIP2 may include a first period P1, a second period P2, a third period P3, a fourth period P4, a fifth period P5, and a sixth period P6, which are continuous, in relation to the i-th scan signals SCi and SSi and the (i+1)-th scan signals SCi+1 and SSi+1.

Hereinafter, a timing of scan signals applied to the i-th pixel PXi and the (i+1)-th pixel PXi+1 when i=1 as an example will be described.

The i-th write scan signal SCi may be activated during the first and third periods P1 and P3 and applied to the i-th pixel PXi. The i-th sampling scan signal SSi may be activated during the first to third periods P1 to P3 and applied to the i-th pixel PXi.

The (i+1)-th write scan signal SCi+1 may be activated during the fourth and sixth periods P4 and P6 and applied to the (i+1)-th pixel PXi+1. The (i+1)-th sampling scan signal SSi+1 may be activated during the first period P1 and the fourth to sixth periods P4 to P6 and applied to the (i+1)-th pixel PXi+1.

Figure 20:
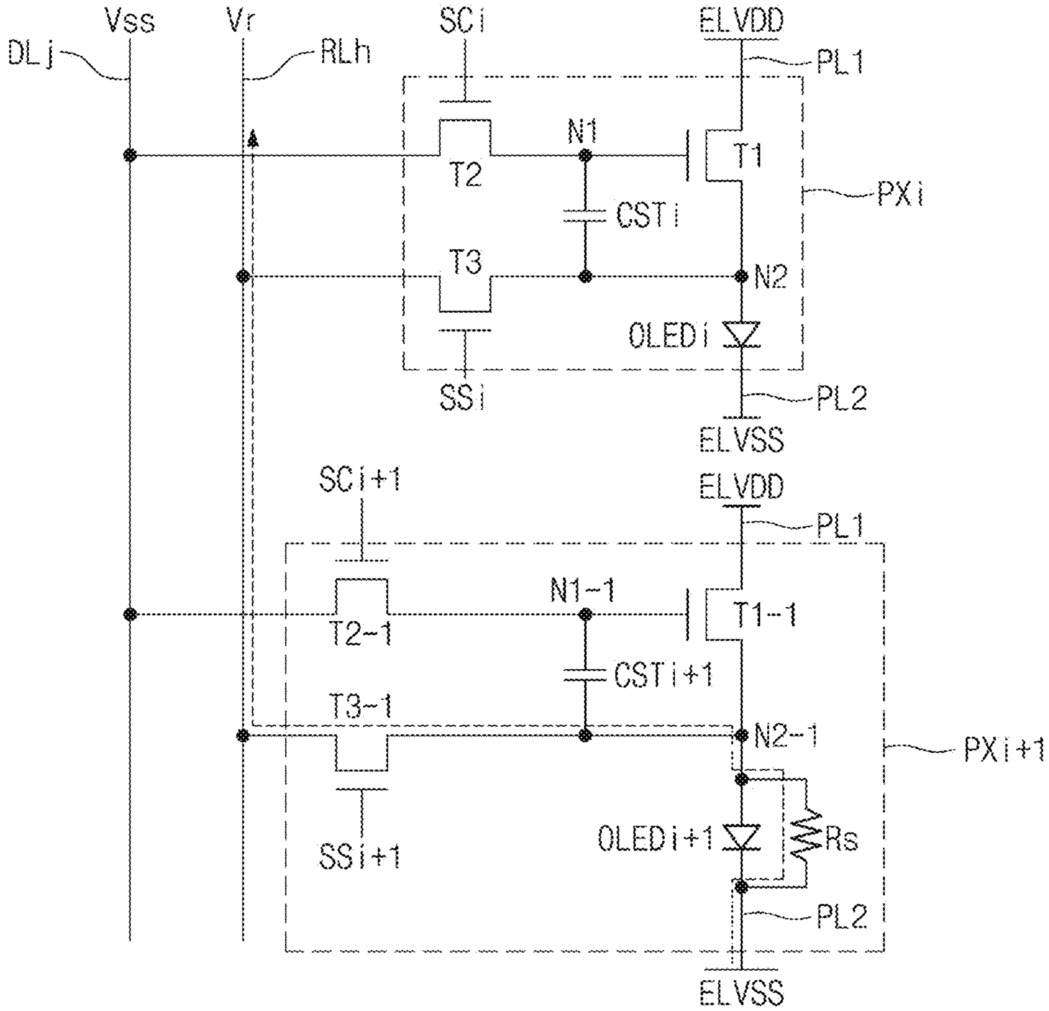
FIG. 20 is a diagram for describing an operation of an i-th pixel and an (i+1)-th pixel during a first sensing period illustrated in FIG. 19.
Figure 21:
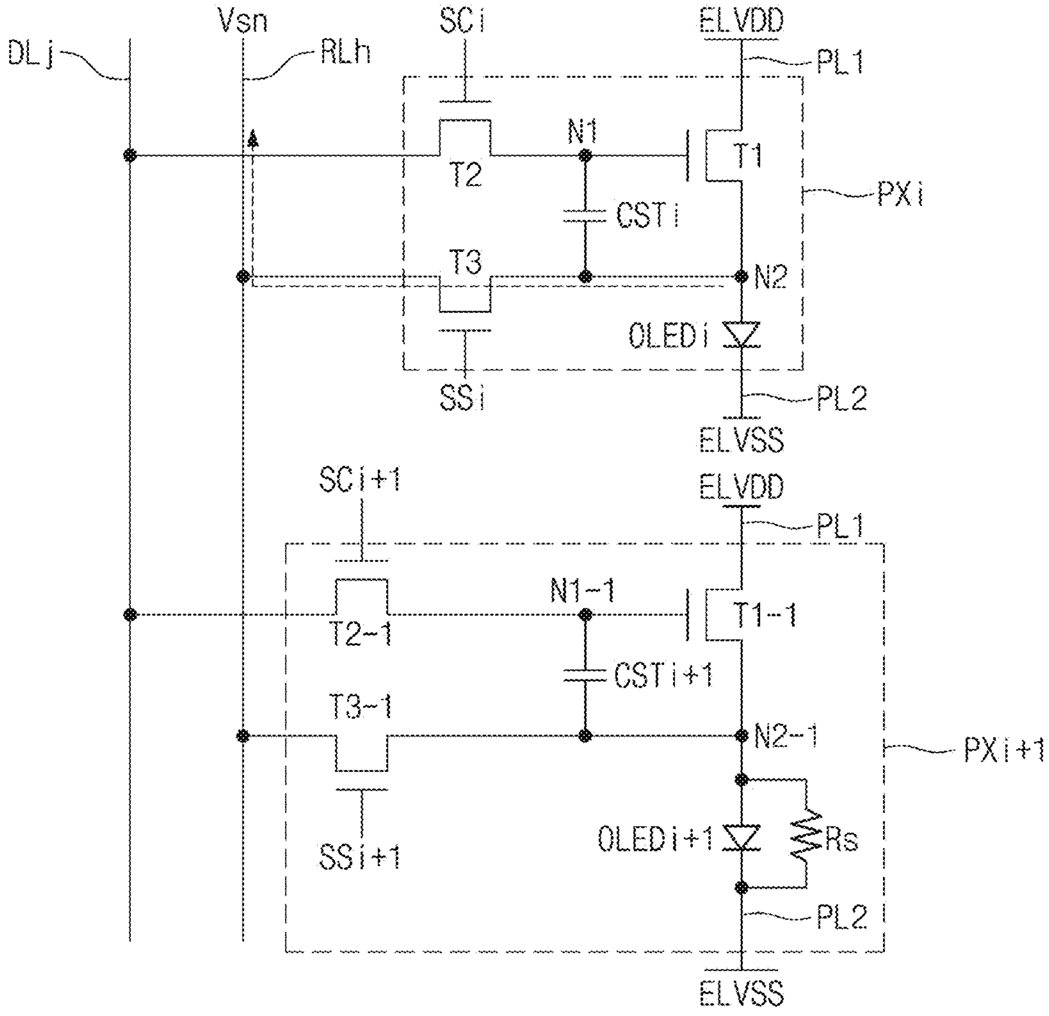
FIG. 21 is a diagram for describing an operation of an i-th pixel and an (i+1)-th pixel during a second sensing period illustrated in FIG. 19.

FIG. 20 is a diagram for describing an operation of an i-th pixel and an (i+1)-th pixel during the first sensing period illustrated in FIG. 19. FIG. 21 is a diagram for describing an operation of an i-th pixel and an (i+1)-th pixel during the second sensing period illustrated in FIG. 19.

Referring to FIG. 20, during the first sensing period SNP1, the i-th pixel PXi may receive a voltage Vss for sensing and the reference voltage Vr through the j-th data line DLj and the h-th reference line RLh in response to the i-th scan signals SCi and SSi. The voltage Vss for sensing may have a voltage level different from that of the data voltage Vs for sensing.

The voltage Vss for sensing may be applied to the first node N1, and the reference voltage Vr may be applied to the second node N2. A gate-source voltage Vgs of the first transistor T1 of the i-th pixel PXi may be sensed according to the voltage Vss for sensing and the reference voltage Vr.

During the first sensing period SNP1, the (i+1)-th pixel PXi+1 may receive the voltage Vss for sensing and the reference voltage Vr through the j-th data line DLj and the h-th reference line RLh in response to the (i+1)-th scan signals SCi+1 and SSi+1.

The voltage Vss for sensing may be applied to the (1-1)-th node N1-1, and the reference voltage Vr may be applied to the (2-1)-th node N2-1. However, the second voltage ELVSS may be connected to the h-th reference line RLh by the short-circuit resistance Rs. Since the second voltage ELVSS is applied to the h-th reference line RLh, a level of the reference voltage Vr may be changed due to an effect of the second voltage ELVSS. Thus, a voltage sensed in the (i+1)-th pixel PXi+1 may be outside a normal sensing voltage level.

In such a case, the timing controller T-CON may discriminate the (i+1)-th pixel PXi+1 as a defective pixel. Thus, a position of a defective pixel may be detected. Since a position of the defective pixel is detected, the i-th pixel PXi disposed in a row preceding that of the (i+1)-th pixel PXi+1, which is discriminated as a defective pixel, may be selected in the blank period BP described above, and the scan signals SCi and SSi may be applied to the i-th pixel PXi.

Referring to FIG. 21, as in the operation in the first period TP1 described with reference to FIG. 12A, during the first period P1, the i-th pixel PXi may receive the data voltage Vs for sensing and the reference voltage Vr in response to the i-th scan signals SCi and SSi.

Thereafter, similar to the operation in the second period TP2 described with reference to FIG. 12B, during the second period P2, a sensing operation on the i-th pixel PXi may be performed, and a sensing voltage Vsn may be output. FIG. 21 substantially illustrates a sensing operation in the second period P2. Thereafter, during the third period P3, the restoration data voltage Vrec described above may be applied to the i-th pixel PXi.

Similar to the operation in the first period P1, during the fourth period P4, the (i+1)-th pixel PXi+1 may receive the data voltage Vs for sensing and the reference voltage Vr in response to the (i+1)-th scan signals SCi+1 and SSi+1. Similar to the operation in the second period P2, during the fifth period P5, a sensing operation on the (i+1)-th pixel PXi+1 may be performed, and similar to the operation in the second period P2, during the sixth period P6, the restoration data voltage Vrec described above may be applied to the (i+1)-th pixel PXi+1. Such an operation may be performed on up to the pixels PX disposed in a last row.

Thus, similar to the operation described with reference to FIGS. 10 and 12A to 12C, sensing voltages Vsn sensed in the pixels PX may be output. As a result, a sensing operation on all the pixels PX may be performed, and driving characteristics with respect to all the pixels PX may be sensed.

The sensing operation described with reference to FIGS. 17A, 17B, and 18 may be additionally performed during the second sensing period SNP2. As described with reference to FIGS. 17A, 17B, and 18, the (i+1)-th sampling scan signal SSi+1 may be applied to the (i+1)-th pixel PXi+1 during the first period P1. Thus, an increased amount of luminance of the i-th pixel PXi according to an effect of the short-circuit resistance Rs may be detected.

The timing controller T-CON may compensate the data voltage Vd applied to the i-th pixel PXi by using an average value of the sensing voltages Vsn, of the i-th pixel PXi, detected in the second sensing period SNP2 and the blank period BP.

In a case in which the (i+1)-th pixel PXi+1 is not a defective pixel, the short-circuit resistance Rs may not be formed. Thus, in a case in which the (i+1)-th pixel PXi+1 is not a defective pixel, even if the (i+1)-th sampling scan signal SSi+1 is applied to the (i+1)-th pixel PXi+1 during the first period P1, the second power line PL2 may not be connected to the h-th reference line RLh.

In a case in which the (i+1)-th pixel is not a defective pixel, since the second voltage ELVSS is not applied to the h-th reference line RLh, a sensing operation may be performed according to the data voltage Vs for sensing and a normal reference voltage Vr.

Figure 22:
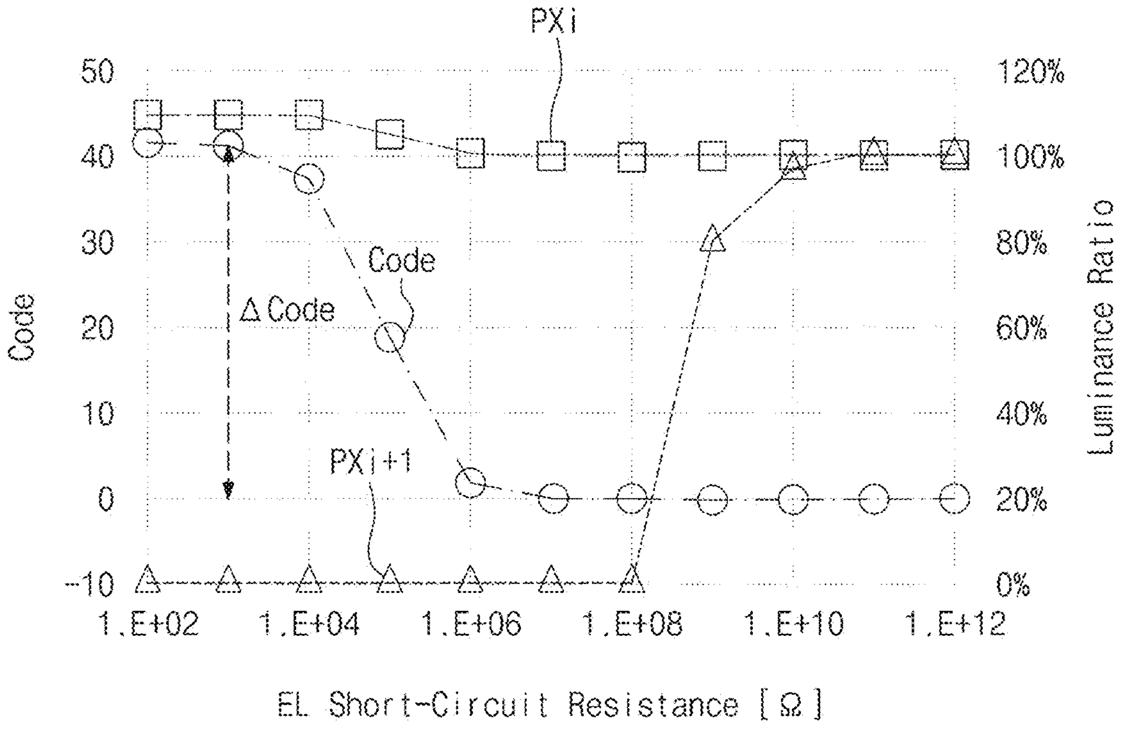
FIG. 22 is a graph showing a test result obtained by testing luminance change in a defective pixel and a preceding pixel while changing short-circuit resistance of the defective pixel.

FIG. 22 is a graph showing a test result obtained by testing luminance change in a defective pixel and a preceding pixel while changing short-circuit resistance of the defective pixel.

Referring to FIG. 22, EL short-circuit resistance may represent the short-circuit resistance Rs described above. As EL short-circuit resistance is low, the degree of short circuit may be high, and as EL short-circuit resistance is high, the degree of short circuit may be low. In a case in which an anode and a cathode are not substantially short-circuited, EL short-circuit resistance may be significantly high, and a state in which EL short-circuit resistance is equal to or higher than about 1.E+10 may represent a state in which the anode and the cathode are substantially not short-circuited.

A code value Code may be a digital value with respect to the sensing voltage Vsn. The timing controller T-CON may compensate the data voltage Vd on the basis of a code value Code. When the sensing voltage is in a normal state, a code value Code may be 0.

Luminance ratio represents luminance ratio with respect to the i-th pixel PXi and the (i+1)-th pixel PXi+1. When luminance ratio of the i-th pixel PXi is 100%, the i-th pixel PXi may have normal luminance. When luminance ratio of the (i+1)-th pixel PXi+1 is 0%, the (i+1)-th pixel PXi+1 may not emit light and may be defined as a defective pixel.

A code value Code may be greater than 0 when a sensing voltage sensed in the i-th pixel PXi increases according to the (i+1)-th pixel PXi+1 which is a defective pixel. When a code value Code is approximately greater than 0, luminance ratio of the i-th pixel PXi may be greater than 100%, and the i-th pixel PXi may be a bright spot pixel. A difference value Δcode between a code value Code of 0 and a code value Code greater than 0 may correspond to the difference value ΔV between the first voltage level VL1 and the second voltage level VL2 described above.

The timing controller T-CON may reduce the data voltage Vd by a value corresponding to a difference value Δcode between a code value Code of 0 and a code value Code greater than 0 and output the data voltage Vd.

Figure 23:
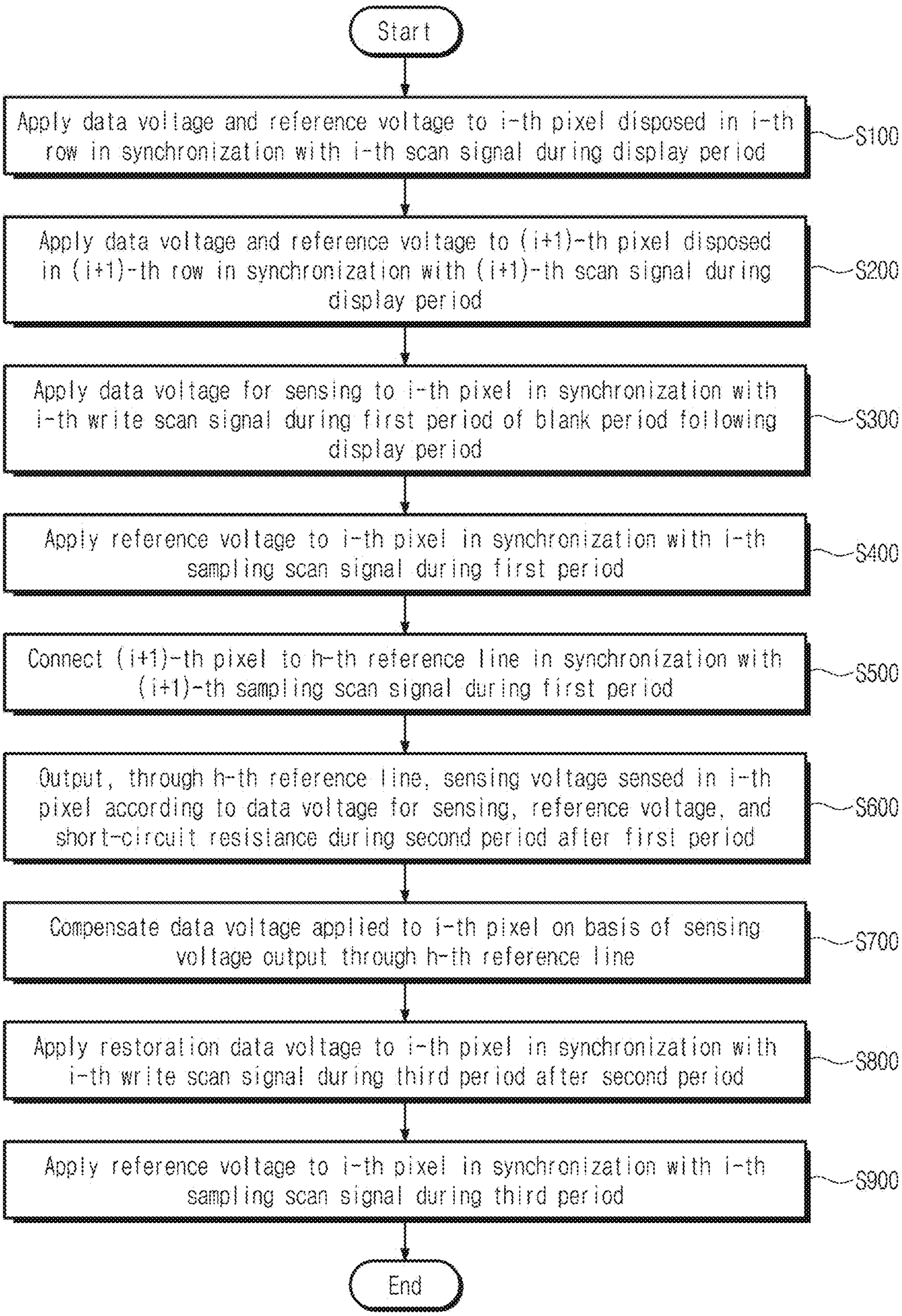
FIG. 23 is a flowchart for describing a driving method of a display device according to an embodiment of the inventive concept.

FIG. 23 is a flowchart for describing a driving method of a display device according to an embodiment of the inventive concept.

The detailed operation is described in detail above, and a driving method of the display device DD will be briefly described with reference to the flowchart illustrated in FIG. 23 below.

Referring to FIG. 23, in a step S100, the data voltage Vd and the reference voltage Vr may be applied to the i-th pixel PXi disposed in the i-th row in synchronization with the i-th scan signals SCi and SSi during the display period DSP. In a step S200, the data voltage Vd and the reference voltage Vr may be applied to the (i+1)-th pixel PXi+1 disposed in the (i+1)-th row in synchronization with the (i+1)-th scan signals SCi+1 and SSi+1 during the display period DSP.

In a step S300, the data voltage Vs for sensing may be applied to the i-th pixel PXi in synchronization with the i-th write scan signal SCi during the first period TP1 of the blank period BP following the display period DSP. In a step S400, the reference voltage Vr may be applied to the i-th pixel PXi in synchronization with the i-th sampling scan signal SSi during the first period TP1.

In a step S500, the (i+1)-th pixel PXi+1 may be connected to the h-th reference line RLh in synchronization with the (i+1)-th sampling scan signal SSi+1 during the first period TP1. Thus, a level of the reference voltage Vr may be lowered by the (i+1)-th pixel PXi+1 during the first period TP1. In a step S600, during the second period TP2 following the first period TP1, the sensing voltage Vsn sensed in the i-th pixel PXi according to the data voltage Vs for sensing, the reference voltage Vr, and the short-circuit resistance Rs may be output through the h-th reference line RLh.

In a step S700, the data voltage Vd applied to the i-th pixel PXi may be compensated on the basis of the sensing voltage Vsn output through the h-th reference line RLh. In a step S800, the restoration data voltage Vrec may be applied to the i-th pixel PXi in synchronization with the i-th write scan signal SCi during the third period TP3 following the second period TP2. In addition, in a step S900, the reference voltage Vr may be applied to the i-th pixel PXi in synchronization with the i-th sampling scan signal SSi during the third period TP3.

According to an embodiment of the inventive concept, when an i-th scan signal is applied to an i-th pixel disposed in an i-th row during a blank period, an (i+1)-th scan signal may be applied to an (i+1)-th pixel which is disposed in an (i+1)-th row and is a defective pixel, and voltage drop according to the (i+1)-th pixel may be reflected in a reference voltage applied to the i-th pixel. When a level of the reference voltage is reduced due to an effect of the (i+1)-th pixel, a sensing voltage sensed in the i-th pixel may increase by a reduced level.

An increased amount of the sensing voltage may substantially correspond to an increased amount of luminance of the i-th pixel. A data voltage applied to the i-th pixel may be compensated on the basis of an increased amount of the sensing voltage. Thus, the luminance of the i-th pixel may be compensated, and the i-th pixel may emit light with normal luminance.

In the above, description has been made with reference to embodiments of the inventive concept, but those skilled or of ordinary skill in the art may understand that various modifications and changes may be made to the inventive concept insofar as such modifications and changes do not depart from the spirit and technical scope of the inventive concept set forth in the claims to be described later.

Therefore, the technical scope of the inventive concept is not to be limited to the contents stated in the detailed description of the specification but should be determined by the claims.

What is claimed is:

1. A display device comprising:

an i-th pixel which is disposed in an i-th row, and during a display period, receives a data voltage and a reference voltage in response to an i-th scan signal; and an (i+1)-th pixel which is disposed in an (i+1)-th row, and during the display period, receives the data voltage and the reference voltage in response to an (i+1)-th scan signal, wherein a blank period following the display period includes a first period, a second period, and a third period, wherein the first period, the second period and the third period are continuous, the i-th scan signal is applied to the i-th pixel during the first to third periods, and the (i+1)-th scan signal is applied to the (i+1)-th pixel during the first period, and during the first period, the i-th pixel receives a data voltage for sensing and the reference voltage, a level of the reference voltage is changed by the (i+1)-th pixel, and i is a natural number.

2. The display device of claim 1, wherein during the display period, the i-th scan signal and the (i+1)-th scan signal are sequentially applied to the i-th pixel and the (i+1)-th pixel, respectively, and the (i+1)-th scan signal at least partially overlaps the i-th scan signal.

3. The display device of claim 1, wherein a level of the reference voltage is lowered by the (i+1)-th pixel during the first period.

4. The display device of claim 1, wherein the i-th scan signal comprises an i-th write scan signal and an i-th sampling scan signal, the (i+1)-th scan signal comprises an (i+1)-th write scan signal and an (i+1)-th sampling scan signal, and the i-th write scan signal is activated during the first and third periods and applied to the i-th pixel, the i-th sampling scan signal is activated during the first to third periods and applied to the i-th pixel, and the (i+1)-th sampling scan signal is activated during the first period and applied to the (i+1)-th pixel.

5. The display device of claim 4, wherein during the first period, the i-th pixel receives the data voltage for sensing in response to the i-th write scan signal and receives the reference voltage in response to the i-th sampling scan signal, and during the first period, the (i+1)-th pixel is connected to a reference line which receives the reference voltage, in response to the (i+1)-th sampling scan signal.

6. The display device of claim 5, wherein the (i+1)-th pixel comprises a light-emitting element including an anode and a cathode wherein the anode and the cathode are short-circuited, and a short-circuit resistance which is formed at a portion of the display device where the short circuit has occurred and is connected to the reference line during the first period.

7. The display device of claim 6, wherein during the second period, the i-th write scan signal is deactivated, and during the second period, a sensing voltage sensed in the i-th pixel according to the data voltage for sensing, the reference voltage, and the short-circuit resistance is output through the reference line.

8. The display device of claim 4, wherein the (i+1)-th write scan signal is deactivated during the first to third periods, and the (i+1)-th sampling scan signal is deactivated during the second and third periods.

9. The display device of claim 4, wherein during the display period, the i-th write scan signal and the i-th sampling scan signal are applied to the i-th pixel at the same timing, the i-th pixel receives the data voltage in response to the i-th write scan signal and receives the reference voltage in response to the i-th sampling scan signal, during the display period, the (i+1)-th write scan signal and the (i+1)-th sampling scan signal are applied to the (i+1)-th pixel at the same timing, and the (i+1)-th pixel receives the data voltage in response to the (i+1)-th write scan signal and receives the reference voltage in response to the (i+1)-th sampling scan signal.

10. The display device of claim 4, further comprising:

a data line which is connected to the i-th and (i+1)-th pixels, receives the data voltage during the display period, receives the data voltage for sensing during the first period, and receives a restoration data voltage during the third period;

a reference line which is connected to the i-th and (i+1)-th pixels and receives the reference voltage during the display period, the first period, and the third period;

an i-th write scan line which is connected to the i-th pixel and receives the i-th write scan signal;

an i-th sampling scan line which is connected to the i-th pixel and receives the i-th sampling scan signal;

an (i+1)-th write scan line which is connected to the (i+1)-th pixel and receives the (i+1)-th write scan signal; and an (i+1)-th sampling scan line which is connected to the (i+1)-th pixel and receives the (i+1)-th sampling scan signal.

11. The display device of claim 10, wherein the i-th pixel comprises:

a first transistor including a first electrode connected to a first power line, a control electrode connected to a first node, and a second electrode connected to a second node;

a second transistor including a first electrode connected to the data line, a second electrode connected to the first node, and a control electrode connected to the i-th write scan line;

a third transistor including a first electrode connected to the reference line, a second electrode connected to the second node, and a control electrode connected to the i-th sampling scan line;

an i-th capacitor including a first electrode connected to the first node and a second electrode connected to the second node; and an i-th light-emitting element including an anode connected to the second node and a cathode connected to a second power line.

12. The display device of claim 11, wherein the (i+1)-th pixel comprises:

a (1-1)-th transistor including a first electrode connected to the first power line, a control electrode connected to a (1-1)-th node, and a second electrode connected to a (2-1)-th node;

a (2-1)-th transistor including a first electrode connected to the data line, a second electrode connected to the (1-1)-th node, and a control electrode connected to the (i+1)-th write scan line;

a (3-1)-th transistor including a first electrode connected to the reference line, a second electrode connected to the (2-1)-th node, and a control electrode connected to the (i+1)-th sampling scan line;

an (i+1)-th capacitor including a first electrode connected to the (1-1)-th node and a second electrode connected to the (2-1)-th node;

an (i+1)-th light-emitting element including an anode connected to the (2-1)-th node and a cathode connected to the second power line; and short-circuit resistance which is formed since a portion of the anode and a portion of the cathode are short-circuited.

13. The display device of claim 10, further comprising a timing controller configured to compensate the data voltage applied to the i-th pixel on the basis of a sensing voltage output through the reference line connected to the i-th pixel during the second period.

14. The display device of claim 4, wherein a display-on period comprising the display period and the blank period, and a display-off period before the display-on period are defined, the display-off period comprises a first sensing period and a second sensing period, during the first sensing period, the i-th scan signal and the (i+1)-th scan signal are sequentially applied to the i-th pixel and the (i+1)-th pixel, respectively, the i-th pixel receives a voltage for sensing and the reference voltage in response to the i-th scan signal, and the (i+1)-th pixel receives the voltage for sensing and the reference voltage in response to the (i+1)-th scan signal.

15. The display device of claim 14, wherein the second sensing period comprises a fourth period, a fifth period, a sixth period, a seventh period, an eighth period, and a nineth period, wherein the fourth period, the fifth period, the sixth period, the seventh period, the eighth period, and the nineth period are continuous, the i-th write scan signal is activated during the fourth and sixth periods of the second sensing period and applied to the i-th pixel, and the i-th sampling scan signal is activated during the fourth to sixth periods of the second sensing period and applied to the i-th pixel, the (i+1)-th write scan signal is activated during the seventh and nineth periods of the second sensing period and applied to the (i+1)-th pixel, and the (i+1)-th sampling scan signal is activated during the fourth period of the second sensing period and the seventh to nineth periods of the second sensing period and applied to the (i+1)-th pixel, and the i-th pixel receives the data voltage for sensing and the reference voltage during the fourth period of the second sensing period, the (i+1)-th pixel receives the data voltage for sensing and the reference voltage during the seventh period of the second sensing period, and a level of the reference voltage is lowered by the (i+1)-th pixel during the fourth period of the second sensing period.

16. A driving method of a display device, the driving method comprising:

applying a data voltage and a reference voltage to an i-th pixel disposed in an i-th row in synchronization with an i-th scan signal during a display period;

applying the data voltage and the reference voltage to an (i+1)-th pixel disposed in an (i+1)-th row in synchronization with an (i+1)-th scan signal during the display period;

applying a data voltage for sensing to the i-th pixel in synchronization with an i-th write scan signal of the i-th scan signal during a first period of a blank period following the display period;

applying the reference voltage to the i-th pixel in synchronization with an i-th sampling scan signal of the i-th scan signal during the first period;

connecting the (i+1)-th pixel to a reference line, which receives the reference voltage, in synchronization with an (i+1)-th sampling scan signal of the (i+1)-th scan signal during the first period; and outputting, through the reference line, a sensing voltage sensed in the i-th pixel during a second period following the first period, wherein i is a natural number.

17. The driving method of claim 16, further comprising compensating the data voltage applied to the i-th pixel on the basis of the sensing voltage output through the reference line.

18. The driving method of claim 16, further comprising lowering a level of the reference voltage by the (i+1)-th pixel during the first period, wherein the (i+1)-th pixel includes a light-emitting element including an anode and a cathode wherein the anode and the cathode are short-circuited, and a short-circuit resistance which is formed at a portion of the display device where the short circuit has occurred and is connected to the reference line during the first period.

19. The driving method of claim 16, further comprising:

applying a restoration data voltage to the i-th pixel in synchronization with the i-th write scan signal during a third period following the second period; and applying the reference voltage to the i-th pixel in synchronization with the i-th sampling scan signal during the third period.

20. An electronic device comprising:

a display device providing an image to a user; and one or more processors configured to process and provide an image signal to the display device, wherein the display device includes an i-th pixel which is disposed in an i-th row, and during a display period, receives a data voltage and a reference voltage in response to an i-th scan signal, and an (i+1)-th pixel which is disposed in an (i+1)-th row, and during the display period, receives the data voltage and the reference voltage in response to an (i+1)-th scan signal, a blank period following the display period includes a first period, a second period, and a third period, wherein the first period, the second period and the third period are continuous, the i-th scan signal is applied to the i-th pixel during the first to third periods, and the (i+1)-th scan signal is applied to the (i+1)-th pixel during the first period, during the first period, the i-th pixel receives a data voltage for sensing and the reference voltage, and during the first period, a level of the reference voltage is lowered by the (i+1)-th pixel, and during a second period following the first period, a sensing voltage sensed in the i-th pixel is output through a reference line, and i is a natural number.

* * * * *